(12) United States Patent
Viehauser et al.

(10) Patent No.: US 12,450,855 B2
(45) Date of Patent: Oct. 21, 2025

(54) VISUAL ALIGNMENT OF DISPLAYED VIRTUAL CONTENT

(71) Applicant: QUALCOMM Incorporated, San Diego, CA (US)

(72) Inventors: Robert Peter Viehauser, Bad Hofgastein (AT); Julia Hauptmann, Salzburg (AT)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 18/606,966

(22) Filed: Mar. 15, 2024

(65) Prior Publication Data

US 2025/0292525 A1 Sep. 18, 2025

(51) Int. Cl.
*G06T 19/20* (2011.01)
*G06F 3/01* (2006.01)
*G06T 7/73* (2017.01)

(52) U.S. Cl.
CPC .............. *G06T 19/20* (2013.01); *G06F 3/013* (2013.01); *G06T 7/73* (2017.01); *G06T 2219/2004* (2013.01)

(58) Field of Classification Search
CPC ... G06T 19/20; G06T 7/73; G06T 2219/2004; G06F 3/013
See application file for complete search history.

(56) References Cited

U.S. PATENT DOCUMENTS

2020/0151427 A1* 5/2020 Kimura .................. G06V 40/18
2024/0311959 A1* 9/2024 Huang .................... H04N 7/014

OTHER PUBLICATIONS

Genc Y., et al., "Optical See-Through HMD Calibration: A Stereo Method Validated with a Video See-Through System", Appeared in the Proceedings of the IEEE and ACM International Symposium on Augmented Reality, Munich, Germany, Oct. 2000, 10 pages.
TREA: "Calibration Techniques for Aligning Real-world Objects to Virtual Objects in an Augmented Reality Environment", Retrieved on Jan. 30, 2024, pp. 1-20.

* cited by examiner

*Primary Examiner* — Chong Wu
(74) *Attorney, Agent, or Firm* — Polsinelli LLP/QUALCOMM Incorporated

(57) ABSTRACT

Systems and techniques for aligning display of virtual content are provided. For example, a method can include obtaining an object 3D vertex position of a feature of a real world object in a 3D map of an environment, wherein the real world object is visible through a display, projecting, relative to an assumed eye position, an initial virtual content 3D vertex position representing a feature of an item of virtual content in the 3D map of the environment onto an initial 2D pixel position, displaying the feature of the item of virtual content on the display at the initial 2D pixel position, obtaining an adjusted virtual content 3D vertex position, and determining an optimized eye position based on the initial virtual content 3D vertex position, the adjusted virtual content 3D vertex position, and a pose of the assumed eye position relative to the 3D map of the environment.

20 Claims, 14 Drawing Sheets

VISUAL ALIGNMENT OF DISPLAYED VIRTUAL CONTENT

FIELD

The present disclosure relates to systems and techniques for providing visual alignment of displayed virtual content.

BACKGROUND

Electronic devices (e.g., extended reality (XR) devices, mobile devices, etc.) can use powerful processors to perform feature analysis (e.g., extraction, tracking, etc.) and other complex functions quickly enough to display an output based on those functions to their users.

XR devices are an example of devices that can perform complex functions and display an output based on those functions. XR devices can include augmented reality (AR) devices, virtual reality (VR) devices, mixed reality (MR) devices, or the like. For instance, examples of AR devices include smart glasses and head-mounted displays (HMDs). In general, an AR device can implement cameras and a variety of sensors to track the position of the AR device and other objects within the physical environment. An AR device can use the tracking information to provide a user of the AR device a realistic AR experience. For example, an AR device can allow a user to experience or interact with immersive virtual environments or content. To provide realistic AR experiences, AR technologies generally aim to integrate virtual content with the physical world. In some examples, AR technologies can match the relative pose and movement of objects and devices. For example, an AR device can use tracking information to calculate the relative pose of devices, objects, and/or maps of the real-world environment in order to match the relative position and movement of the devices, objects, and/or the real-world environment. Using the pose and movement of one or more devices, objects, and/or the real-world environment, the AR device can anchor content to the real-world environment in a convincing manner. The relative pose information can be used to match virtual content with the user's perceived motion and the spatio-temporal state of the devices, objects, and real-world environment.

SUMMARY

According to at least one illustrative example, a method for aligning display of virtual content is provided. The method includes: obtaining an object 3D vertex position representing a position of a feature of a real world object in a 3D map of an environment, wherein the real world object is visible through a display; projecting, relative to an assumed eye position, an initial virtual content 3D vertex position onto an initial 2D pixel position of the display, wherein the initial virtual content 3D vertex position represents a position of a feature of an item of virtual content in the 3D map of the environment, the initial virtual content 3D vertex position being at a known position relative to the object 3D vertex position; displaying the feature of the item of virtual content on the display at the initial 2D pixel position; obtaining an adjusted virtual content 3D vertex position representing an adjustment of the initial virtual content 3D vertex position; and determining an optimized eye position based on the initial virtual content 3D vertex position, the adjusted virtual content 3D vertex position, and a pose of the assumed eye position relative to the 3D map of the environment.

In another example, an apparatus for processing one or more frames is provided that includes a memory configured to store at least one frame and one or more processors (e.g., implemented in circuitry) coupled to the memory. The one or more processors are configured to and can: obtain an object three-dimensional (3D) vertex position representing a position of a feature of a real world object in a 3D map of an environment, wherein the real world object is visible through a display; project, relative to an assumed eye position, an initial virtual content 3D vertex position onto an initial two-dimensional (2D) pixel position of the display, wherein the initial virtual content 3D vertex position represents a position of a feature of an item of virtual content in the 3D map of the environment, the initial virtual content 3D vertex position being at a known position relative to the object 3D vertex position; display the feature of the item of virtual content on the display at the initial 2D pixel position; obtain an adjusted virtual content 3D vertex position representing an adjustment of the initial virtual content 3D vertex position; and determine an optimized eye position based on the initial virtual content 3D vertex position, the adjusted virtual content 3D vertex position, and a pose of the assumed eye position relative to the 3D map of the environment.

In another example, a non-transitory computer-readable medium is provided that has stored thereon instructions that, when executed by one or more processors, cause the one or more processors to: obtain an object three-dimensional (3D) vertex position representing a position of a feature of a real world object in a 3D map of an environment, wherein the real world object is visible through a display; project, relative to an assumed eye position, an initial virtual content 3D vertex position onto an initial two-dimensional (2D) pixel position of the display, wherein the initial virtual content 3D vertex position represents a position of a feature of an item of virtual content in the 3D map of the environment, the initial virtual content 3D vertex position being at a known position relative to the object 3D vertex position; display the feature of the item of virtual content on the display at the initial 2D pixel position; obtain an adjusted virtual content 3D vertex position representing an adjustment of the initial virtual content 3D vertex position; and determine an optimized eye position based on the initial virtual content 3D vertex position, the adjusted virtual content 3D vertex position, and a pose of the assumed eye position relative to the 3D map of the environment.

In accordance with another embodiment of the present disclosure, an apparatus for calibrating a phased array antenna is provided. The apparatus includes: means for obtaining an object 3D vertex position representing a position of a feature of a real world object in a 3D map of an environment, wherein the real world object is visible through a display; means for projecting, relative to an assumed eye position, an initial virtual content 3D vertex position onto an initial 2D pixel position of the display, wherein the initial virtual content 3D vertex position represents a position of a feature of an item of virtual content in the 3D map of the environment, the initial virtual content 3D vertex position being at a known position relative to the object 3D vertex position; means for displaying the feature of the item of virtual content on the display at the initial 2D pixel position; means for obtaining an adjusted virtual content 3D vertex position representing an adjustment of the initial virtual content 3D vertex position; and means for determining an optimized eye position based on the initial virtual content 3D vertex position, the adjusted virtual content 3D vertex position, and a pose of the assumed eye position relative to the 3D map of the environment.

In some aspects, one or more of the apparatuses described herein is or is part of a camera, a mobile device (e.g., a mobile telephone or so-called "smart phone" or other mobile device), a wireless communication device, an extended reality device (e.g., a virtual reality (VR) device, an augmented reality (AR) device, or a mixed reality (MR) device), a wearable device, a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications (e.g., associated with processing of the image), and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
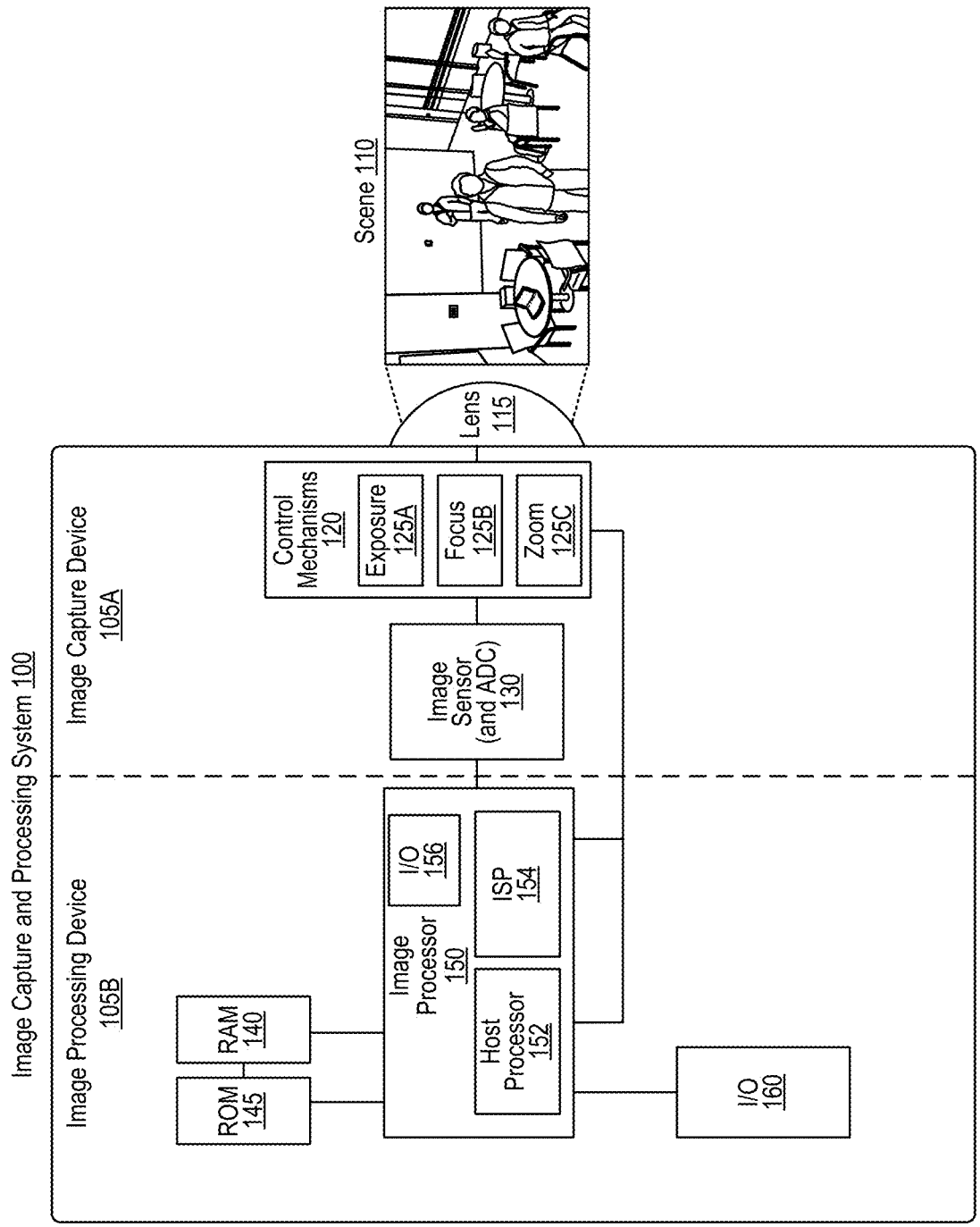
FIG. 1 is a block diagram illustrating an architecture of an image capture and processing device, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In some implementations, the output of one or more sensors (e.g., an accelerometer, a gyroscope, one or more inertial measurement units (IMUs), and/or other sensors) can be used to determine a pose of a device (e.g., HMD, mobile device, or the like). An IMU is an electronic device that measures the specific force, angular rate, and/or the orientation of an electronic device, using a combination of one or more accelerometers, one or more gyroscopes, and/or one or more magnetometers. In some examples, the one or more sensors can output measured information associated with the capture of an image captured by a camera of the device (e.g., the HMD, the mobile device, or the like) and/or depth information obtained using one or more depth sensors of the device.

In the context of systems that track movement through an environment, such as XR systems and/or VSLAM systems, degrees of freedom (DoF) can refer to which of the six degrees of freedom the system is capable of tracking. 3DoF systems generally track the three rotational DoF—pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Systems that track movement through an environment, such as XR systems and/or VSLAM systems, generally include powerful processors. These powerful processors can be used to perform complex operations quickly enough to display an up-to-date output based on those operations to the users of these systems. Such complex operations can relate to feature tracking, 6DoF tracking, VSLAM, rendering virtual objects to overlay over the user's environment in XR, animating the virtual objects, and/or other operations discussed herein. Powerful processors typically draw power at a high rate. Sending large quantities of data to powerful processors typically draws power at a high rate, and such systems often capture large quantities of sensor data (e.g., images, location data, and/or other sensor data) per second. Headsets and other portable devices typically have small batteries so as not to be uncomfortably heavy to users. Thus, typical XR headsets either must be plugged into an external power source, are uncomfortably heavy due to inclusion of large batteries, or have very short battery lives.

XR devices are an example of devices that can perform complex functions and display an output based on those functions. XR devices can include augmented reality (AR) devices, virtual reality (VR) devices, mixed reality (MR) devices, or the like. Examples of XR systems or devices include head-mounted displays (HMDs), smart glasses, among others. As used herein, the terms XR system and XR device are used interchangeably.

XR systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. In some cases, an XR system can track parts of the user (e.g., a hand and/or fingertips of a user) to allow the user to interact with items of virtual content.

For example, an AR device can implement cameras and a variety of sensors to track the position of the AR device and other objects within the physical environment. An AR device can use the tracking information to provide a user of the AR device a realistic AR experience. For example, an AR device can allow a user to experience or interact with immersive virtual environments or content. To provide realistic AR experiences, AR technologies generally aim to integrate virtual content with the physical world. In some examples, AR technologies can match the relative pose and movement of objects and devices. For example, an AR device can use tracking information to calculate the relative pose of devices, objects, and/or maps of the real-world environment in order to match the relative position and movement of the devices, objects, and/or the real-world environment. The relative pose information can be used to match virtual content with the user's perceived motion and the spatio-temporal state of the devices, objects, and real-world environment. Using the pose and movement of one or more devices, objects, and/or the real-world environment, the AR device can display virtual content relative to the real-world environment in a convincing manner. In one illustrative example, the AR device can anchor virtual content to the real-world environment.

In some cases, displaying virtual content relative to the real-world environment includes translating the desired three-dimensional (3D) position of the virtual object within a 3D representation (e.g., a 3D map) of the real-world environment into two-dimensional (2D) pixel positions on a display. For example, the 3D representation of the virtual object can be projected from the 3D representation using various projection techniques (e.g., perspective projection, weak perspective projection, and/or any other projection techniques). In some cases, a 3D to 2D projection can be performed relative to a user's eye position. For example, some AR devices may include one or more eye trackers for capturing a user's eye position relative to a display.

However, some AR devices may not include eye trackers and/or other techniques for directly measuring a user's eye position. In some implementations, an AR device may utilize an estimated eye position to perform 3D to 2D projection. In some aspects, the difference between a user's actual eye position and the estimated eye position may result in the virtual content appearing in the wrong position on the display such that the virtual content appears misaligned with the real-world environment. In some cases, such errors in the apparent position of virtual objects in the real-world environment can result in a less convincing experience for a user. Accordingly, systems and techniques are needed for aligning the display of virtual content (also referred to as XR content herein), relative to a user's true eye position when eye tracking is unavailable and/or insufficient to determine the user's true eye position.

As described in more detail herein, systems, apparatuses, methods (also referred to as processes, and computer-readable media (collectively referred to herein as "systems and techniques")) are described for visual alignment of virtual content. In some cases, the systems and techniques can provide for calibration of a user's eye position during use of an AR device. For example, the AR device may project 3D virtual content from a 3D map of the environment onto a display based on an assumed eye position. The AR device may attempt to project the 3D virtual content in proximity to and/or anchored to a real world object. In some cases, if the assumed eye position estimate is incorrect, the projection of the 3D virtual content on the display will appear to the user to be misaligned with the real-world object. In some cases, the 3D virtual content can be a 3D representation of a real world object with known dimensions that can be used for estimation of the user's eye position. In some implementations, the real world object used for calibration may be a calibration target selected for the purposes of calibration. In some cases, the calibration target may be an object of known size that is likely to be available to a user of the AR device (e.g., a sheet of paper, a keyboard, a mobile device, etc.).

In some examples, the AR device may obtain a 3D adjustment of the 3D virtual content in a 3D map (e.g., a 3D map of the environment) that produces proper alignment between the displayed pixel positions of the projection of the 3D virtual content and the real world object from the perspective of a user. In some aspects, the AR device may provide a user interface for aligning the 3D virtual content with the real world object. In some implementations, the user interface may allow a user to align the corners (e.g., alignment points) of an outline of the 3D virtual content with the corners of the real world object. In one illustrative example, where the real world object is a 2D image target (e.g., an image on a thin sheet of paper) of known size, the user alignment of the 3D virtual content in the 3D map may result in an adjustment of the 3D virtual content with a depth component (e.g., a z-axis component) that is equal to zero. However, in some cases, the user alignment of the 3D virtual content in the 3D map may result in an adjustment of the 3D virtual content with components in all three dimensions of the 3D map.

In some cases, the AR device can determine the position of the user's eye based on the 3D adjustment of the 3D virtual content to achieve alignment of the projection of the 3D virtual content with the real world object. In some examples, the user aligned position of the 3D virtual content in the 3D map, the original position of the 3D virtual content in the 3D map (e.g., prior to user adjustment), and the relative pose of the assumed eye position to the position of the real object in the 3D map can be utilized to optimize an estimate of the user's eye position (e.g., an optimized eye position).

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 10:
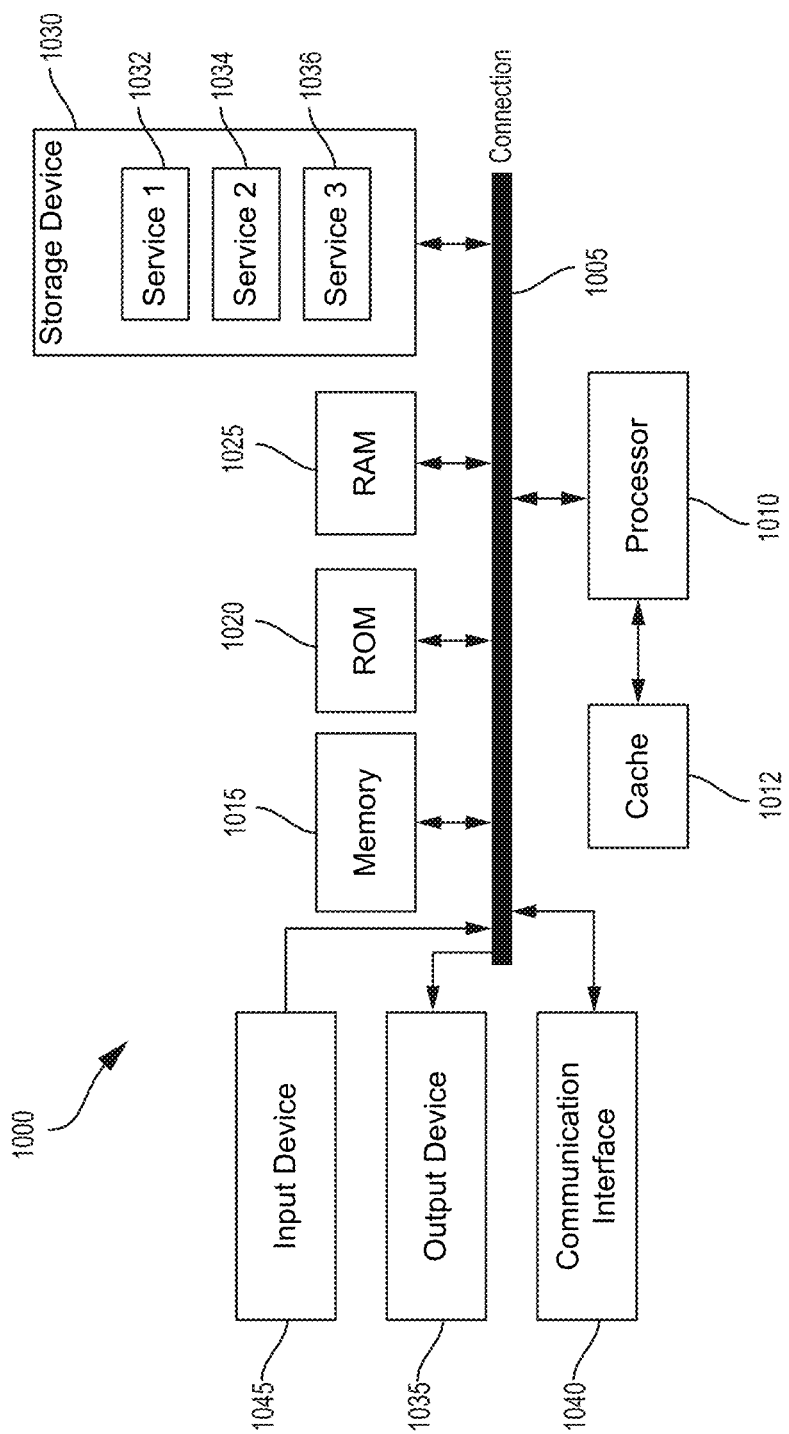
FIG. 10 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1010 discussed with respect to the computing system 1000 of FIG. 10. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image processing device 105B, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1002.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more or fewer components than those shown in FIG. 1. In some cases, the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
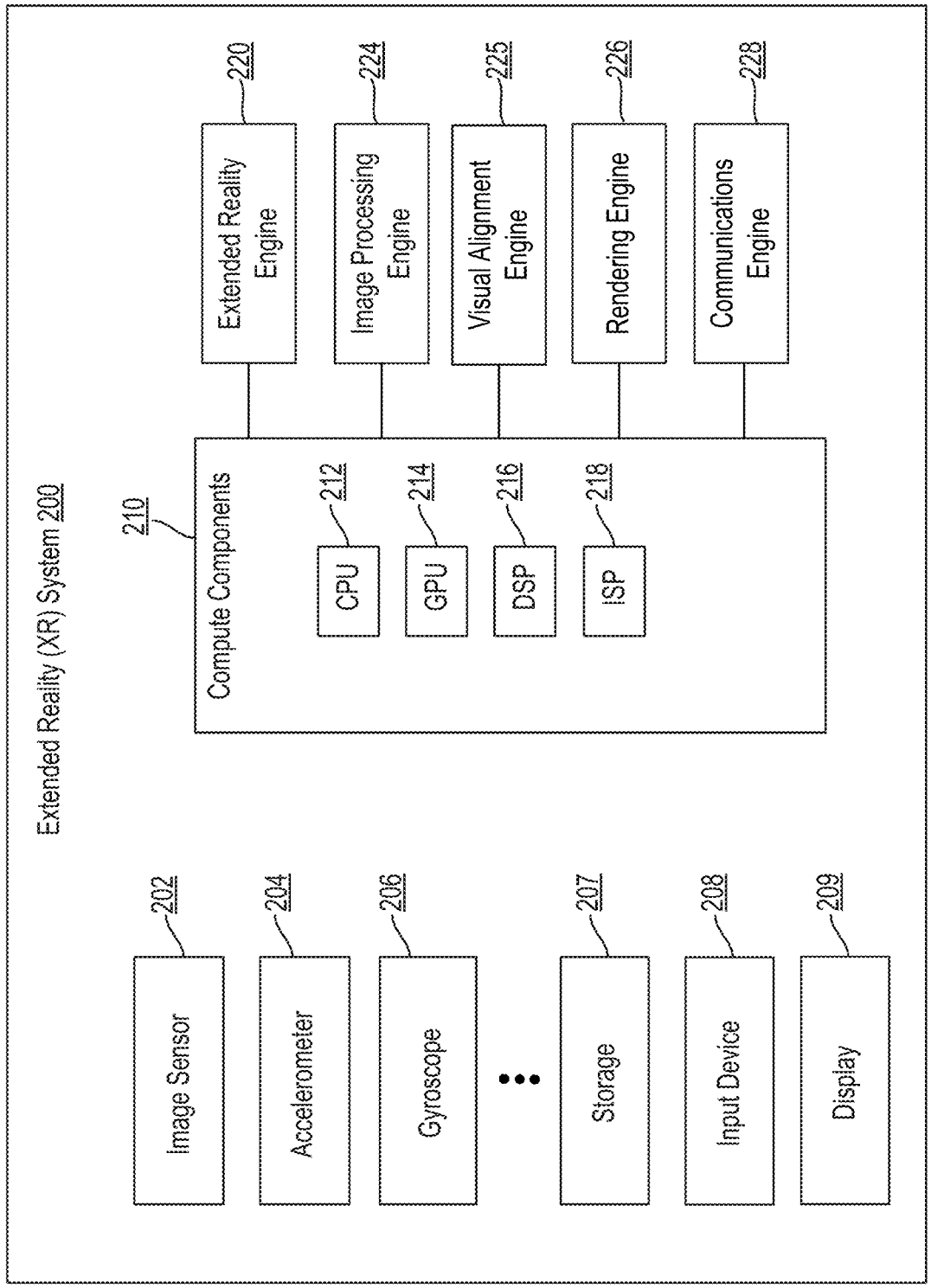
FIG. 2 is a block diagram illustrating an architecture of an example extended reality (XR) system, in accordance with some examples of the present disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a visual alignment engine 225, a rendering engine 226, and a communications engine 228. It should be noted that the components 202-228 shown in FIG. 2 are non-limiting examples provided for illustrative and explanation purposes, and other examples can include more, fewer, and/or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 can include or can be in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1045 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 1040 of FIG. 10.

In some implementations, the one or more image sensors 202, the accelerometer 204, the gyroscope 206, storage 207, compute components 210, XR engine 220, image processing engine 224, visual alignment engine 225, and rendering engine 226 can be part of the same computing device. For example, in some cases, the one or more image sensors 202, the accelerometer 204, the gyroscope 206, storage 207, compute components 210, XR engine 220, image processing engine 224, visual alignment engine 225, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, visual alignment engine, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, data from the visual alignment engine (e.g., eye position) and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, visual alignment engine 225, and the rendering engine 226. In other examples, the compute components 210 can also implement one or more other processing engines.

In some implementations, the image processing engine 224 may include or be included in an image capture and processing system 100, an image capture device 105A, an image processing device 105B, image processor 150, host processor 152, ISP 154, and/or any combination thereof.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, visual alignment engine 225, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, the visual alignment engine 225, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
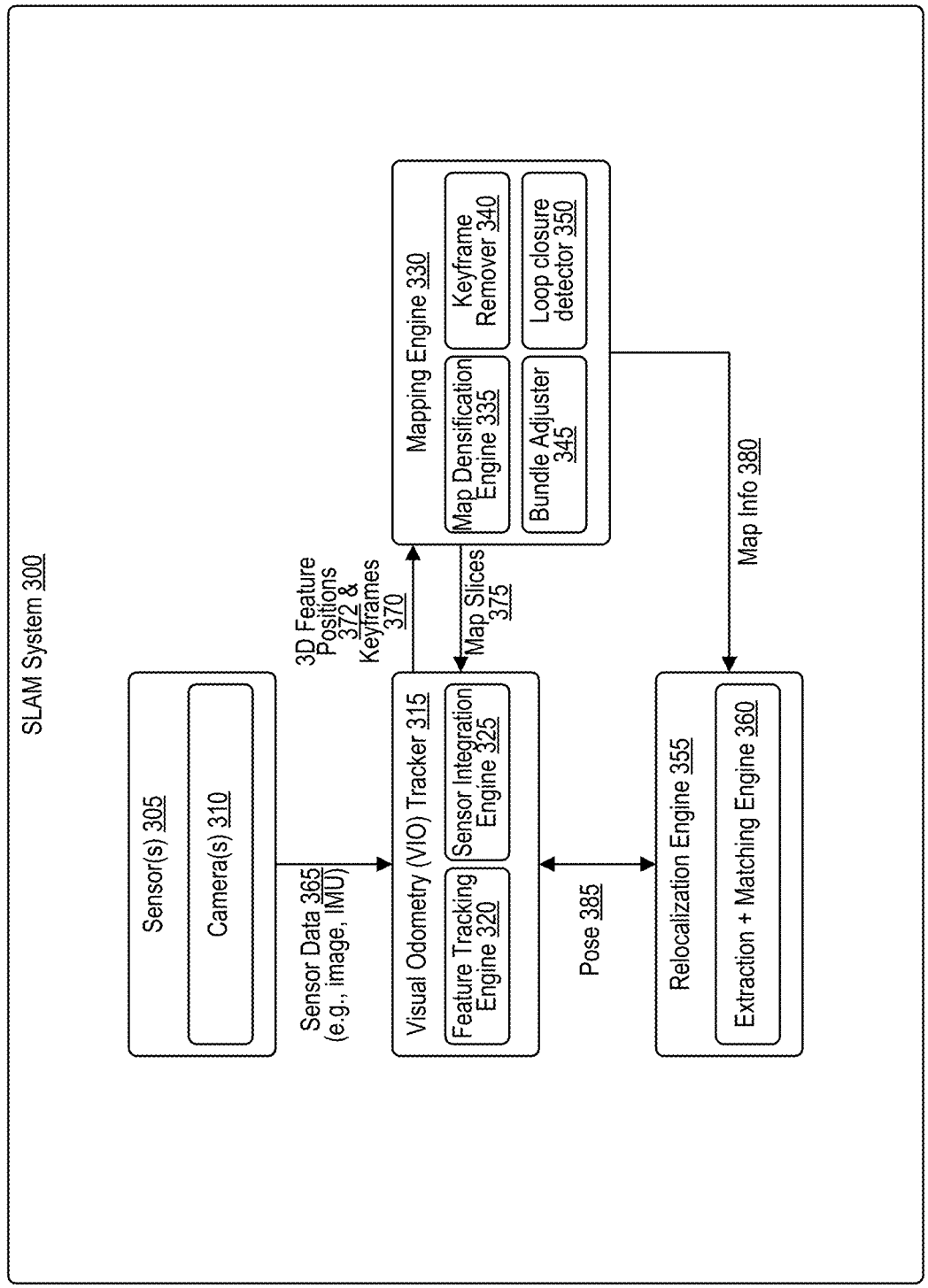
FIG. 3 is a block diagram illustrating an architecture of a simultaneous localization and mapping (SLAM) device, in accordance with some examples of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 372 of a particular feature. The 3D feature positions 372 can include one or more 3D feature positions and can also be referred to as 3D feature points. The 3D feature positions 372 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 372 of the particular feature when considered by the feature tracking engine 320 and/or the sensor integration engine 325 for determination of the 3D feature positions 372. In some examples, a keyframe corresponding to a particular feature also includes data about the pose 385 of the SLAM system 300 and/or the camera(s) 310 during capture of the keyframe. In some examples, the VIO tracker 315 can send 3D feature positions 372 and/or keyframes 370 corresponding to one or more features to the mapping engine 330. In some examples, the VIO tracker 315 can receive map slices 375 from the mapping engine 330. The VIO tracker 315 can extract feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 372 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 372. The map information 380 can include one or more keyframes 370 corresponding to certain features and certain 3D feature positions 372.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can extract features from an image captured by the cameras 310 of the SLAM system 300 while the SLAM system 300 is at a current pose 385, and can match the extracted features to features depicted in different keyframes 370, identified by 3D feature positions 372, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic object can be an object that has a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Returning to FIG. 2, as noted above, XR system 200, including the compute components 210, the XR engine 220, the visual alignment engine 225, the rendering engine 226 of the and/or any combination thereof, can position and/or anchor virtual content in a specific location(s) on the 3D map of the environment (e.g., a 3D map generated by XR system 200 of FIG. 2 and/or SLAM system 300 of FIG. 3), and render the virtual content on the display 209 such that the virtual content appears to be at a location in the environment corresponding to the specific location on the map of the scene where the virtual content is positioned and/or anchored.

Figure 4A:
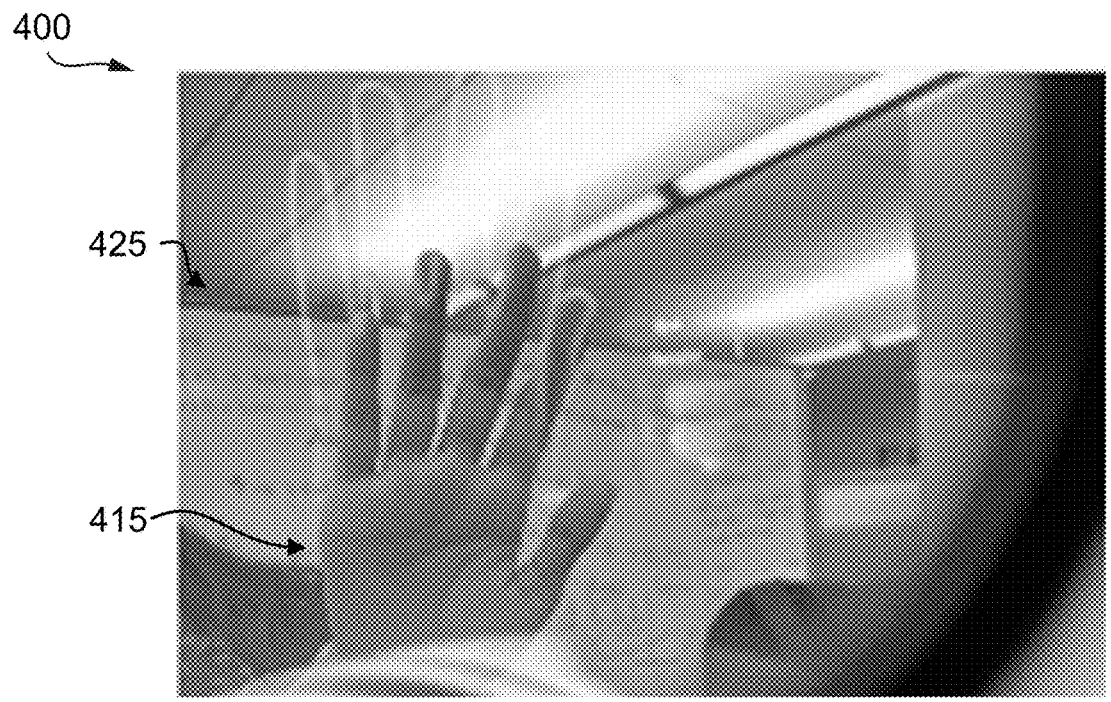
FIG. 4A is an example illustration of a misaligned display virtual content, in accordance with some examples of the present disclosure.

FIG. 4A shows an image 400 including a real world object 415 and displayed virtual content 425 that is visually misaligned with the real world object. In the illustrated example of FIG. 4A, the real world object 415 includes fingers and a portion of the palm of a hand. In some examples, the real world object 415 can correspond to the hand of a user of an XR system (e.g., XR system 200 of FIG. 2).

In some cases, the real world object 415 can be represented in a 3D map (e.g., a 3D map generated by XR system 200 of FIG. 2 and/or SLAM system 300 of FIG. 3). As used herein, "3D mapped real world object" refers to a 3D representation (e.g., 3D vertices) of a real world object within a 3D map. In some cases, 3D virtual content (e.g., for virtual content 425) can be positioned within the 3D map relative to and/or anchored to the 3D mapped real world object (e.g., for real world object 415). As used herein, "3D virtual content" hereinafter refers to a 3D representation (e.g., 3D vertices) of virtual content within a 3D map. In one illustrative example, 3D vertices representing the 3D virtual content can be positioned overlapping, in contact with, and/or in close proximity to the 3D mapped real world object in the 3D map.

In some cases, an XR system (e.g., XR system 200 of FIG. 2) can render (e.g., by the rendering engine 226) the 3D virtual content (e.g., for virtual content 425) as a 2D representation (e.g., pixel positions) for output to a display (e.g., display 209 of FIG. 2). In some implementations, rendering the 3D virtual content can include projecting the 3D virtual content from the 3D map on to a 2D plane representing the display. In the example of FIG. 4A, a desired outcome of rendering the virtual content 425 may be to display an outline that visually aligns the contours of the real world object 415 (e.g., a user's hand) with the virtual representation of the user's hand in the 3D map. However, as illustrated in FIG. 4A, despite the proximity and/or contact of the 3D virtual content and the 3D mapped real world object in the 3D map, the outcome of rendering the 3D virtual content can result in misalignment of the displayed virtual content 425 relative to the real world object 415.

Figure 4B:
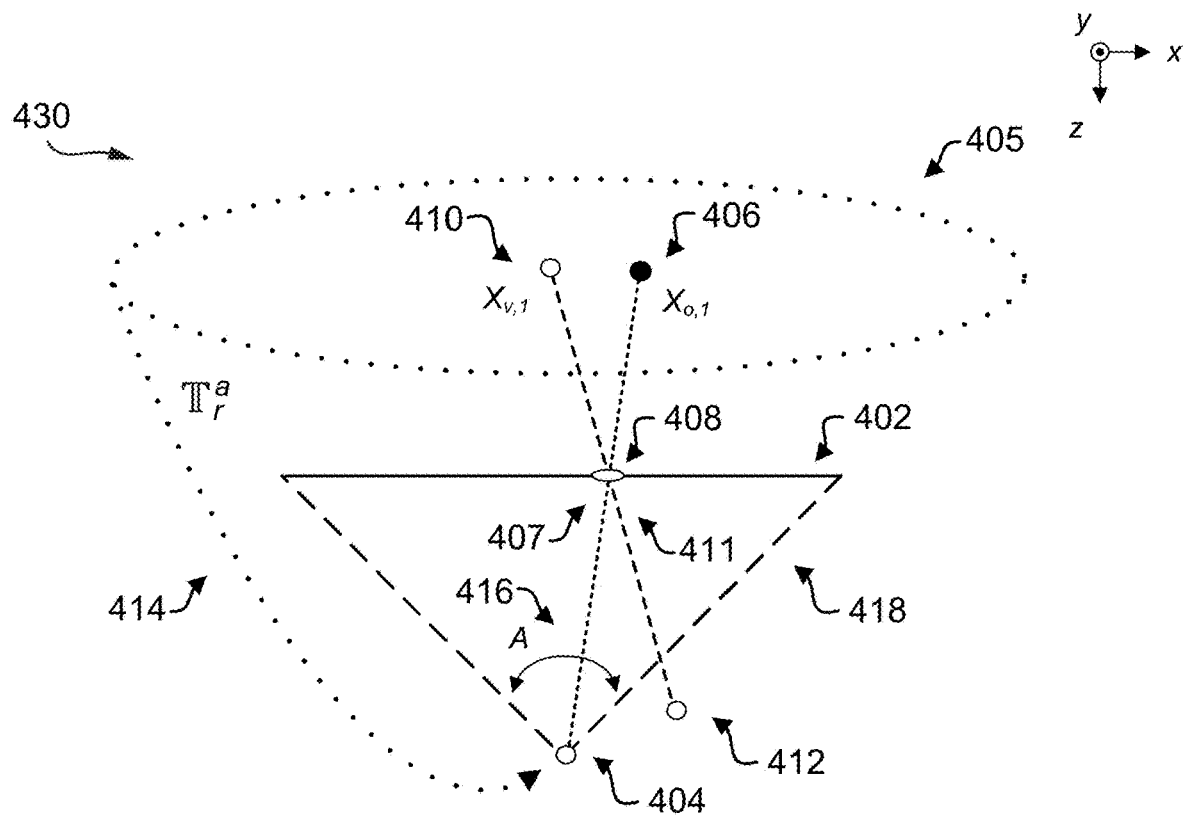
FIG. 4B is a diagram illustrating the misalignment of the virtual content and real world content of FIG. 4A in relation to a 3D map, a display, an assumed eye position, and an actual eye position, in accordance with some examples of the present disclosure.

FIG. 4B is a diagram 430 illustrating the misalignment of the virtual content 425 and real world object 415 of FIG. 4A in relation to a 3D map 405, a display 402, an assumed eye position 404, and a true user eye position 412. In the illustrated example of FIG. 4B, 3D mapped real world content corresponding to real world object 415 of FIG. 4A is represented in the 3D map 405 by one or more 3D vertices 406. For the purposes of illustration, the projection of the 3D mapped real world object in FIG. 4B will be described with respect to 3D vertex $X_{o,1}$, which can represent one 3D vertex included in N 3D vertices $X_{o,n}$ of the one or more 3D vertices 406, wherein N is an integer. As illustrated in FIG. 4B, one or more 2D pixel positions 408 on the display 402 can be generated by projecting the one or more 3D vertices 406 onto an image plane corresponding to the display 402.

In some aspects, in order for the displayed virtual content 425 of FIG. 4A to appear with correct alignment relative to the real world object 415, the projection can be performed relative to user eye position in 3D space. However, in some implementations, an exact user eye position may be unknown. For example, some XR systems may not include eye tracking functionality that determines user eye position in 3D space. In some cases, an assumed eye position can be used to perform the projection. In the illustrated example of FIG. 4B, the assumed eye position 404 can correspond to a center point of a HMD, smart glasses, or the like.

FIG. 4B illustrates projection of one or more 3D vertices 406 onto 2D pixel positions 408 of the display 402. In some cases, the view frustum 418 can correspond to the region of 3D space in the 3D map that may appear on the display relative to an observer position. In one illustrative example, the view frustum 418 for an observer positioned at the assumed eye position 404 may be obtained by extending a ray from the assumed eye position passing through each corner of the display in 3D space and extending to a maximum viewing distance in the z-axis dimension.

In some cases, a view frustum (e.g., view frustum 418) can be represented mathematically by frustum angles 416 A, where A={$\alpha_{top}$, $\alpha_{bottom}$, $\alpha_{left}$, $\alpha_{right}$}, which are the angles between an observer position and the top, bottom, left, and right of the view frustum 418, respectively. In some cases, the projection of a 3D vertex X from an observer position can be represented mathematically as illustrated in Equation (1) below:

$$\vec{x} = P_A(\mathbb{T}(X)) \qquad (1)$$

Where $P_A$ is a projection matrix based on frustum angles A associated with the observer position, $\mathbb{T}$ represents the relative pose 414 of the 3D coordinate space (e.g., the 3D map 405) relative to an observer pose (e.g., a pose of a virtual camera at the observer position), and $\vec{x}$ is a vector representing the projected 2D pixel position on the display 402 of a 3D vertex X.

In one illustrative example, FIG. 4B shows the projection of a 3D vertex $X_{o,1}$ onto the display relative to an assumed eye position 404. In the example of FIG. 4B, ray 407 can correspond the 2D projection vector $\vec{x}$ of Equation (1), 3D vertex $X_{o,1}$ can correspond to 3D vertex X of Equation (1), and the view frustum 418 can correspond to the view frustum A of Equation (1). As illustrated, the ray 407 is projected from the assumed eye position 404, passes through a corresponding 2D pixel position of the 2D pixel position 408, and extends to the 3D vertex $X_{o,1}$.

In another illustrative example, as shown in FIG. 4B, a ray 411 is projected from a true user eye position 412, passes through a corresponding 2D pixel position of the 2D pixel positions 408, and extends to the 3D vertex $X_{v,1}$. In the example of FIG. 4B, ray 417 can correspond the 2D projection vector x of Equation (1), 3D vertex $X_{v,1}$ can correspond to 3D vertex X of Equation (1), and a view frustum (not shown) extending from the true user eye position 412 through the corners of the display 402 can correspond to the view frustum A of Equation (1).

In some examples, the 2D pixel positions 408 corresponding to projections of the one or more 3D vertices 406 (e.g., 3D vertices $X_{o,i}$) can be perceived from the true user eye position 412 as if the one or more 3D vertices 406 were projected onto the display from one or more virtual 3D vertices 410 (e.g., 3D vertices $X_{v,i}$). For example, as described above, a 2D pixel position 408 corresponding to the projection of 3D vertex $X_{o,1}$, from the assumed eye position 404 may instead appear to be projected onto the display from the 3D vertex $X_{v,1}$, when viewed from the true user eye position 412. Accordingly, the virtual content 425 may appear misaligned with the real world object 415 as illustrated in FIG. 4A. In the illustrated example of FIG. 4B, 3D vertex $X_{v,1}$ is provided for the purposes of illustration and may not represent actual data stored in the 3D map.

Figure 4C:
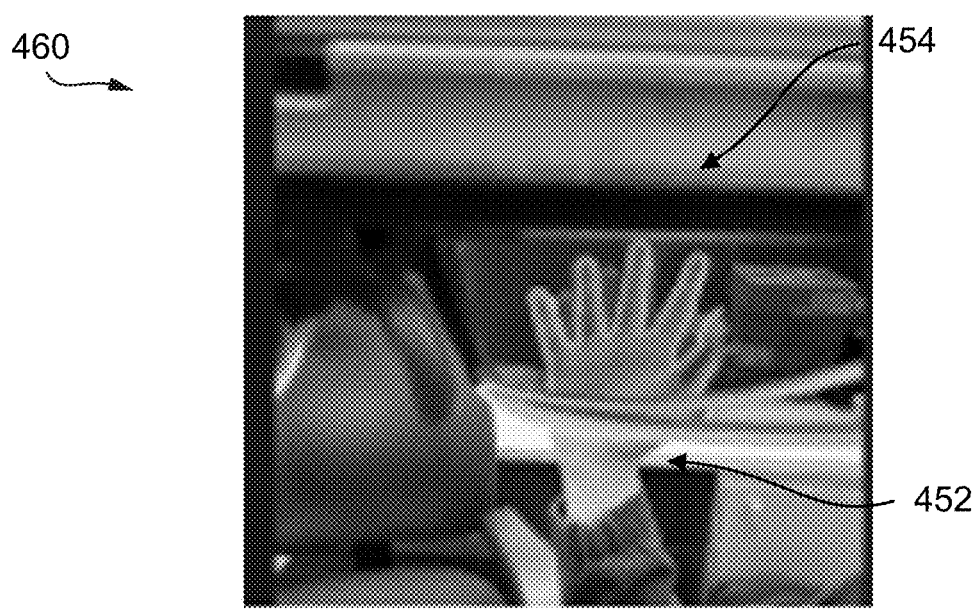
FIG. 4C is an example illustration of an aligned display of virtual content, in accordance with some examples of the present disclosure.

FIG. 4C is an image 460 illustrating an example of a real world object 452 aligned with virtual content 454. Similar to the image 400 of FIG. 4C, the real world object 452 is a hand. In addition, the virtual content 454 has the appearance of an outline of the hand. In the example of FIG. 4C, the virtual content 454 has the appearance of being anchored to the real world object 452. As illustrated by FIG. 4A and FIG. 4C, in some cases, alignment of virtual content with real world objects can improve a user experience when interacting with an XR environment.

Figure 5A:
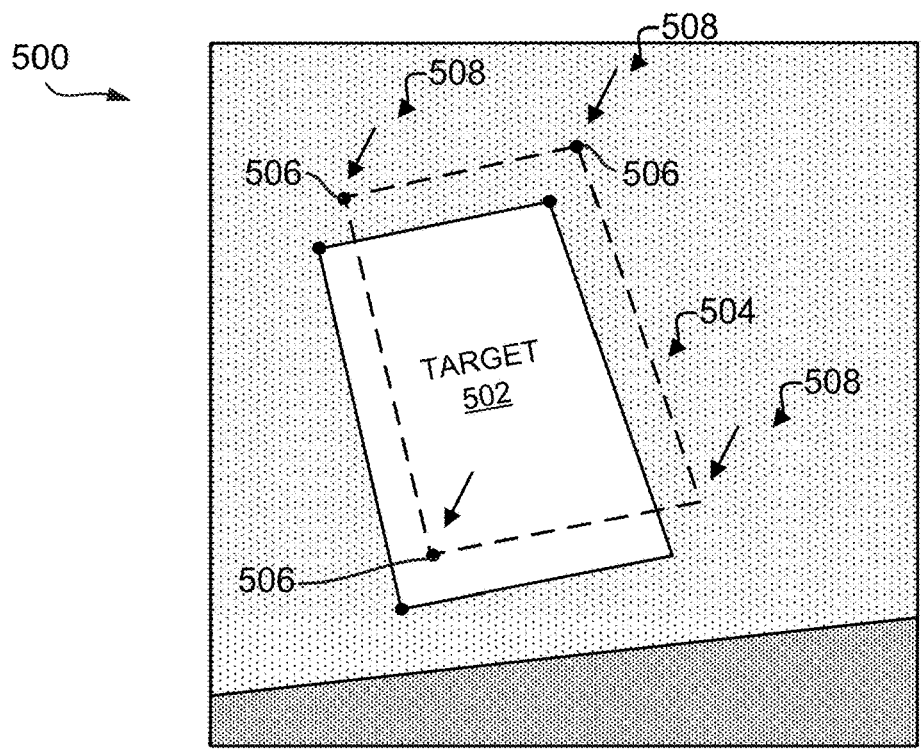
FIG. 5A and FIG. 5B illustrate a calibration operation for improving alignment between real world content and virtual content displayed on a display of an XR system, in accordance with some examples of the present disclosure.
Figure 5B:
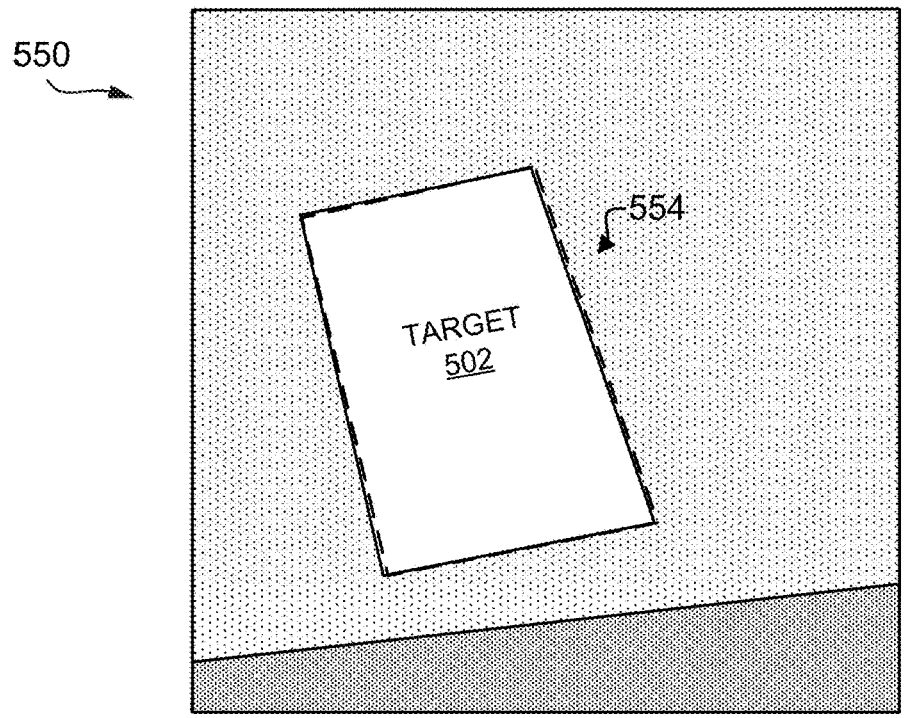

FIG. 5A and FIG. 5B illustrate a calibration operation for improving alignment between real world content and virtual content displayed on a display of an XR system (e.g., XR system 200 of FIG. 2). In the illustrated example 500 of FIG. 5A, a calibration target 502 can be a real world object. For example, the calibration target 502 can include, without limitation, an image, a sheet of paper, a measuring device (e.g., a ruler, tape measure, etc.), a keyboard, a mobile device, a mouse pad, or the like. In some implementations, the calibration target 502 can have known dimensions. In some cases, the calibration target 502 can be visible through the display.

In some cases, the calibration target 502 can be mapped by an XR system (e.g., XR system 200 of FIG. 2) and included in a 3D map of an environment. In the illustrated example, 3D virtual content 504 includes a rectangular outline matching the dimensions of the calibration target 502. In some examples, misalignment between the projection of the 3D virtual content 504 on the display and the calibration target 502 can result from utilizing an assumed eye position for the projection as described above with respect to FIG. 4A and FIG. 4B.

In some cases, a user interface can be provided that allows a user to adjust the position of the 3D virtual content 504 such that the calibration target 502 and the projection of the 3D virtual content on the display appear aligned. In some cases, a user may align a plurality of 3D alignment points 506 between the calibration target 502 and the projection of the 3D virtual content 504 displayed on the display. In some cases, the 3D alignment points 506 of the 3D virtual content 504 may be visible to the user. In some implementations, 3D alignment points 506 of the 3D virtual content 504 may not be visible to the user.

In the illustrated example of FIG. 5A, adjustment vectors 508 are represented by arrows indicating movement of the virtual content 504 from the originally projected position to a user-aligned position aligned to the calibration target 502. In some implementations, the XR system can capture an adjustment vector 508 for each 3D alignment point 506. As illustrated, FIG. 5B is a diagram 550 illustrating user adjusted 3D virtual content 554 that, when projected onto the display, is aligned with the calibration target 502 after the user adjustment.

FIG. 6A through FIG. 6E are diagrams illustrating a process for determining an optimized eye position based on adjustments (e.g., adjustment vectors 508 of FIG. 5A) obtained during a calibration operation. In the illustrative examples of FIG. 6A through 6D, display 602, assumed eye position 604, 3D map 605, 3D vertices 606, ray 607, 2D pixel positions 608, 3D vertices 610, ray 611, true user eye position 612, pose 614, frustum angles 616, and view frustum 618 can correspond to display 402, assumed eye position 404, 3D map 405, 3D vertices 406, ray 407, 2D pixel positions 408, 3D vertices 410, ray 411, true user eye position 412, pose 414, frustum angles 416, and view frustum 418.

Figure 6A:
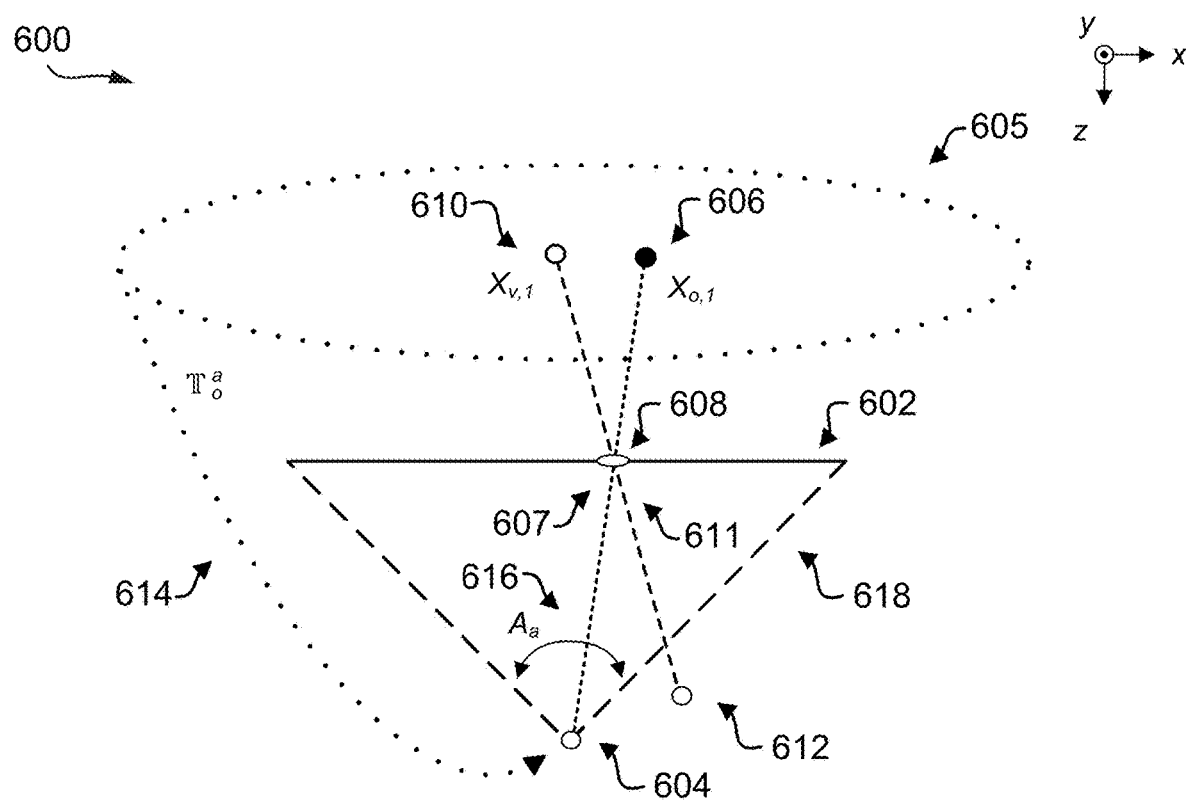
FIG. 6A through FIG. 6E are diagrams illustrating a process for determining an optimized eye position based on adjustments obtained during a calibration operation, in accordance with some examples of the present disclosure.

FIG. 6A is a diagram 600 illustrating a scenario of misaligned 3D vertices 610 of virtual content relative to 3D vertices 606 as illustrated in FIG. 4A and FIG. 5A. In the example of FIG. 6A, 3D vertices 606 can represent 3D vertices $X_{o,i}$ corresponding to an original position of a 3D modeled calibration target (e.g., calibration target 502 of FIG. 5A and FIG. 5B) in the 3D map 605 of the environment. In some cases, the 2D pixel positions of projections of 3D vertices 606 can be referred to as initial 2D pixel positions 608 of the calibration target (e.g., the real world object).

Figure 6B:
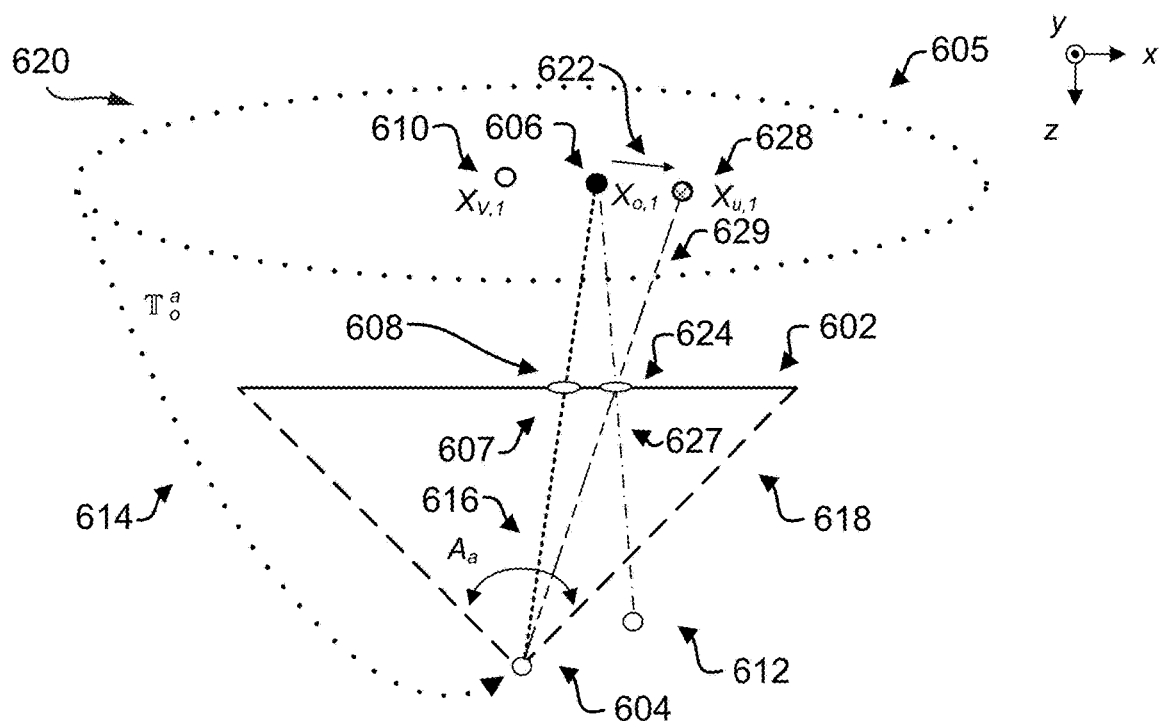

FIG. 6B is a diagram 620 illustrating incorporation of calibration adjustments (e.g., adjustment vectors 508 of FIG. 5A) into the 3D map 605. As noted above, a user can make adjustments to the original positions of the 3D vertices 606 of the 3D virtual content in the 3D map 605 to align the displayed virtual content (e.g., a projection of 3D virtual content 504 of FIG. 5A on a display) to the calibration target (e.g., calibration target 502 of FIG. 5A). As illustrated in FIG. 6B, an adjustment vector 622 can represent an adjustment vector for one alignment point (e.g., 3D alignment point 506 of FIG. 5A) of the 3D virtual content. In some implementations, application of the adjustment vectors to the original positions of the 3D vertices 606 of the 3D virtual content in the 3D map 605 can result in user adjusted 3D virtual content with corresponding user aligned 3D vertices 628 (e.g., user aligned 3D vertices $X_{u,i}$).

Figure 6C:
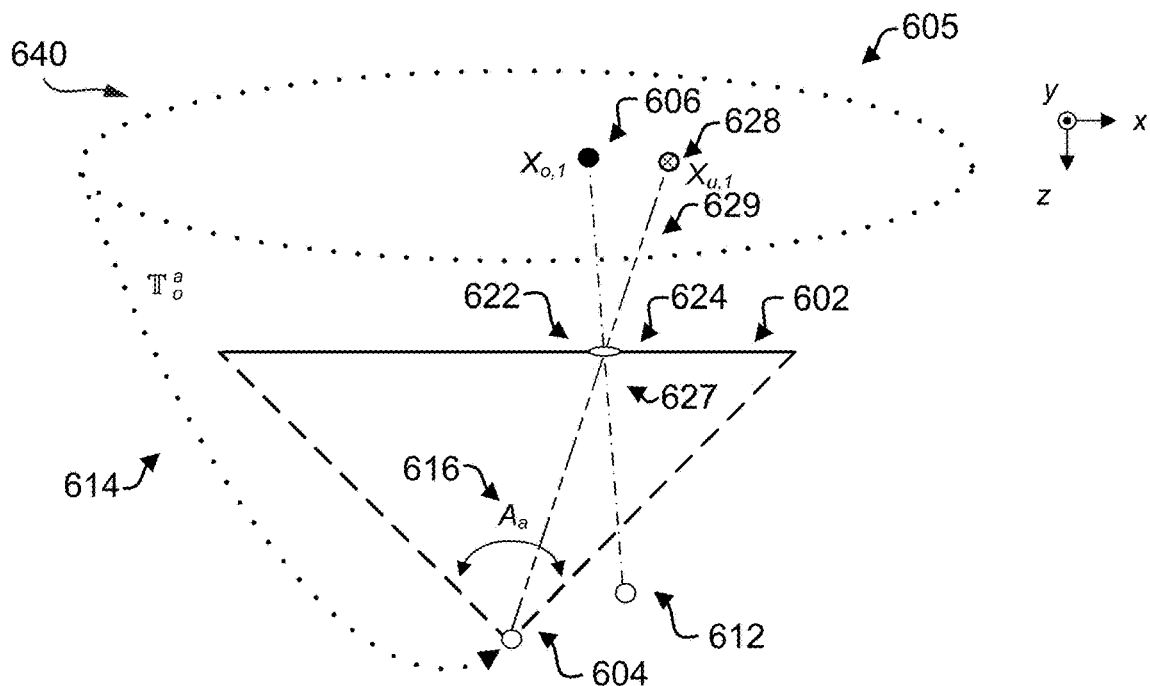

In some cases, the 3D vertices 628 can be projected from the assumed eye position 604 to the adjusted 2D pixel positions 624 on the display. As illustrated, a ray 629 passes through the assumed eye position 604, the user aligned 3D vertex $X_{u,1}$, and the 2D pixel position 624 of the projection of the 3D vertex $X_{u,1}$ on the display. As further illustrated by FIG. 6B, a ray 627 passes through the true user eye position 612, the 3D vertices $X_{o,i}$ corresponding to the original position of a 3D modeled calibration target, and the 2D pixel position 624 of the projection of the 3D vertex $X_{o,1}$ on the display FIG. 6C is a diagram 640 that corresponds to FIG. 6B with the 3D vertices 610, adjustment vector 622, ray 607, and 2D pixel positions 608 associated with the virtual content prior to the user adjustments removed to provide additional visual clarity.

Figure 6D:
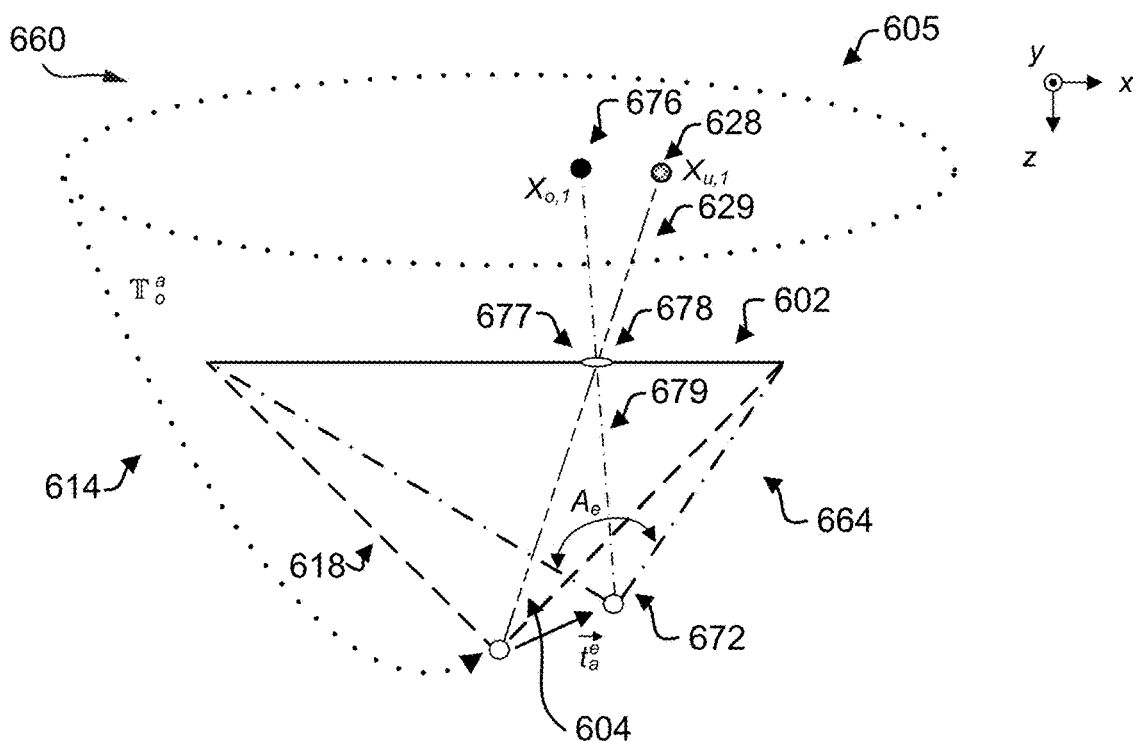

FIG. 6D is a diagram 660 illustrating determination of the estimated eye position 672. In some cases, the 3D vertices 676 can be projected relative to an estimated eye position 672 at 2D pixel positions 677 on the display as shown in Equation (2) below:

$$\vec{x}_{oe,i} = P_{A_e}(\mathbb{T}_o^a(X_{o,i}) + \vec{t}_a^e) \qquad (2)$$

Where $A_e$ includes the frustum angles for the estimated eye position 672, $P_{A_e}$ is a projection matrix from the estimated eye position 672, $\vec{x}_{oe,i}$ is a vector representing the projected 2D pixel position 677 of a particular 3D vertex $X_{o,i}$ and $\vec{t}_a^e$ is a 3D translation vector between the assumed eye position and the estimated eye position. As illustrated in FIG. 6D, the projection matrix frustum angles $A_e$ and corresponding view frustum 664 for the estimated eye position can be different from frustum angles for the assumed eye position $A_a$ (e.g., frustum angles 416 of FIG. 4B). In some aspects, the frustum angles $A_e$ for the estimated eye position 672 can depend on the 3D translation vector ta based on an assumption that the display plane is static. In some examples, $P_{A_e}$ can be fully determined by knowing the display position and the frustum angles $A_e$.

In the example of FIG. 6D, a ray 679 extends from the estimated eye position 672 to the 3D vertex $X_{o,1}$ and passes through a corresponding 2D pixel position (e.g., represented by $\vec{x}_{oe,i}$) of the 2D pixel positions 677.

In some examples, 3D vertices 628 corresponding to the 3D alignment points 506 (e.g., after user alignment) can be projected relative to the assumed eye position 604 at 2D pixel positions 678 as shown in Equation (3) below:

$$\vec{x}_{ua,i} = P_{A_a}(\mathbb{T}_o^a(X_{u,i})) \qquad (3)$$

Where $A_a$ includes the frustum angles for the assumed eye position, $P_{A_a}$ is a projection matrix from the assumed eye position and $\vec{x}_{u,i}$ is a vector representing the projected 2D pixel position of a particular 3D vertex $X_{u,i}$.

In some cases, the projected 2D pixel positions 677 may be different from the 2D pixel positions 678. In some examples, differences between the 2D pixel positions 677 and 2D pixel positions 678 can be considered residual error resulting from an inaccurate estimated eye position 672. In some implementations, the estimated eye position 672 can be optimized by minimizing the residual errors in the differences between the 2D pixel positions 677 and 2D pixel positions 678 as shown in Equation (4) below:

$$\operatorname*{argmin}_{\vec{t}_a^e} \sum_{i \in N} \rho(\vec{x}_{ua,i} - \vec{x}_{oe,i}) \qquad (4)$$

Where $\rho$ is a loss function, N is the total number of 3D vertices being compared between the projections shown in Equation (2) and the projections shown in Equation (3). The loss function $\rho$ can include, without limitation, a Tukey loss function, a Cauchy loss function, and/or any other suitable loss function. In some cases, the translation vector $\vec{t}_a^e$ value when the loss function is minimized can provide the optimized eye position. In some implementations, the difference $\vec{x}_{ua,i} - \vec{x}_{oe,i}$ may be minimized without use of any additional loss function $\rho$. However, use of the loss function $\rho$ may improve the robustness of the optimization of the optimized eye position.

Figure 6E:
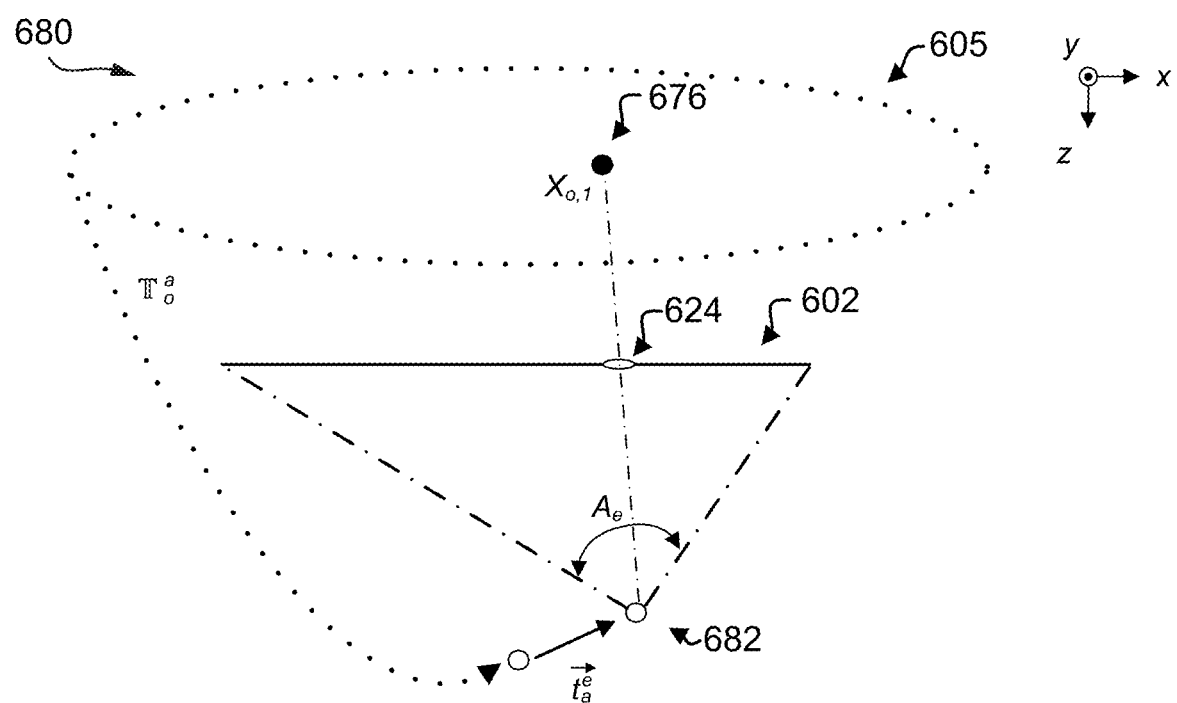

FIG. 6E is a diagram 680 illustrating virtual content corresponding to the 3D vertices 676 correctly appearing aligned with the position of the real world object in the 3D map 605 when displayed at the 2D pixel positions 624 of the display 602 when projected from an optimized eye position 682.

In some cases, a calibration process to obtain an optimized eye position as illustrated by FIG. 6A through FIG. 6E and Equation (2) through Equation (4) can be performed on a user-by-user basis. For example, individual users may have different facial features, inter-pupil distances, and/or other factors that may require different optimized eye positions to obtain alignment between virtual content and real world objects.

Figure 7A:
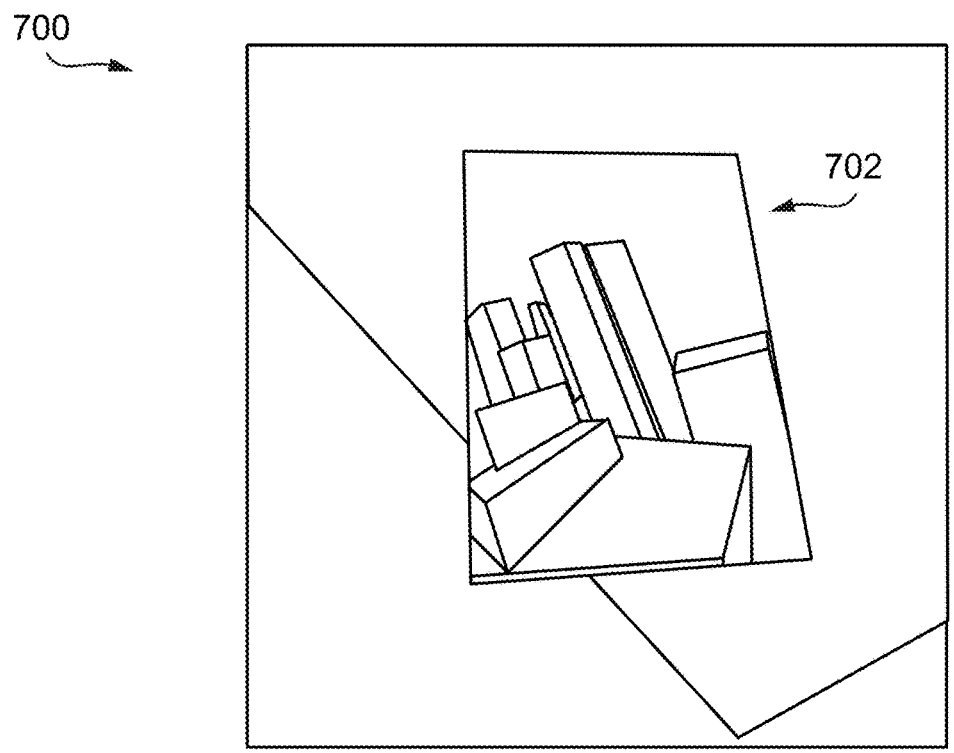
FIG. 7A through FIG. 7C are diagrams illustrating display of virtual content anchored to real world content before and after determining an optimized eye position, in accordance with some examples of the present disclosure.
Figure 7B:
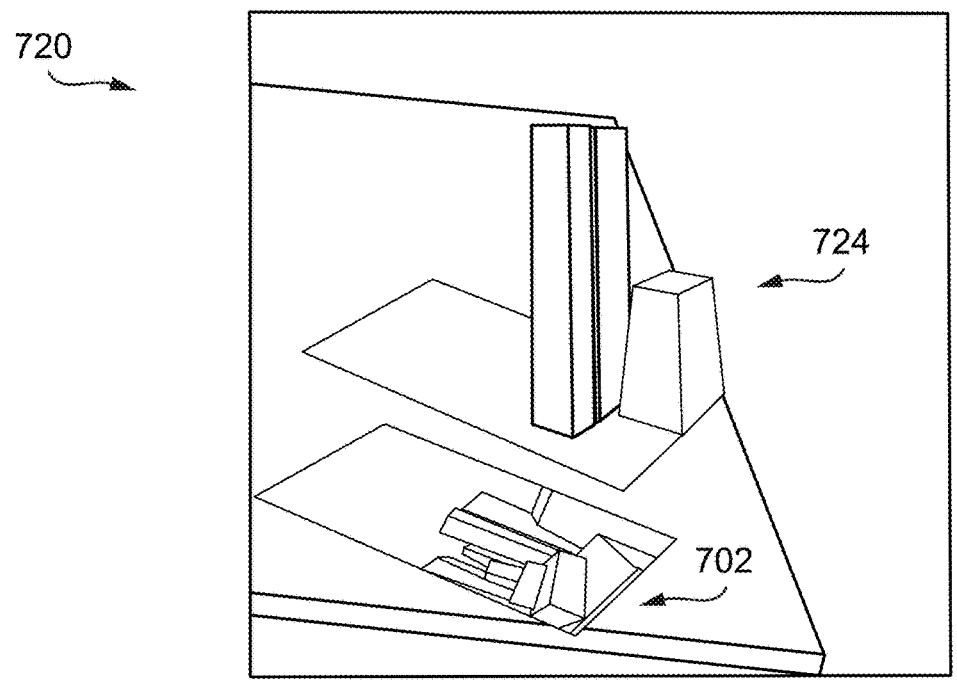
Figure 7C:
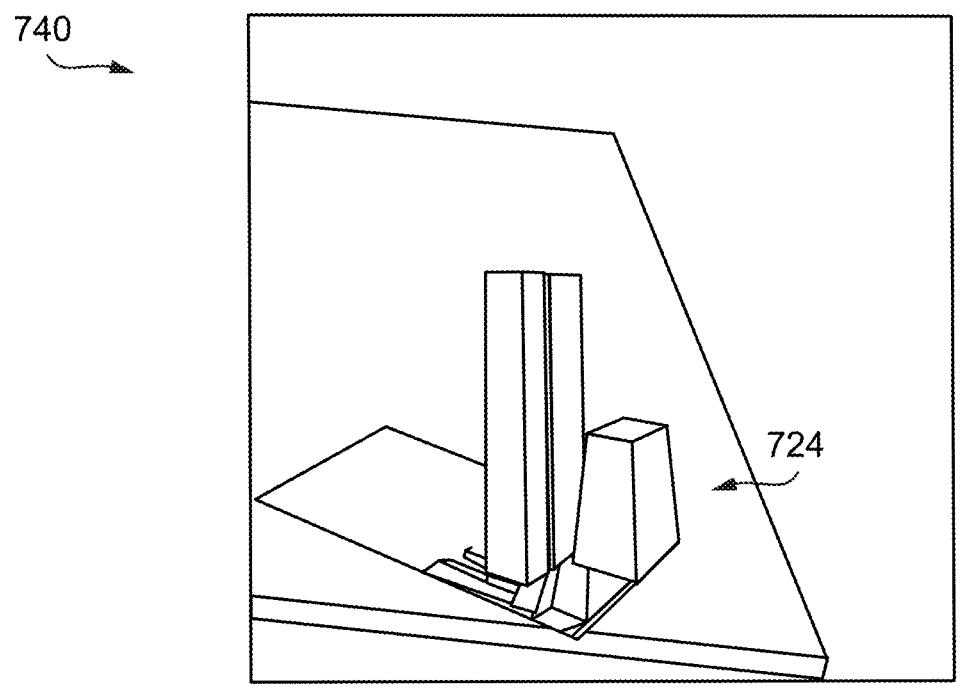

FIG. 7A through FIG. 7C are images illustrating an example of virtual content that is misaligned with a real world object before calibration that becomes aligned with the real world object after calibration. The images in FIG. 7A through FIG. 7C can represent an environment as viewed by a user of an XR system (e.g., an HMD, smart glasses, or the like).

FIG. 7A is an image 700 illustrating an example real world object 702 (e.g., a magazine, comic book, brochure, or the like) on a table. In the illustrated example of FIG. 7A, the real world object 702 includes a representation of buildings.

FIG. 7B is an image 720 illustrating example virtual content 724 that is misaligned with the real world object 702. As illustrated, the virtual content 724 can include 3D representations of some or all of the buildings represented on the real world object 702. However, due to an inaccurate assumed eye position, the virtual content 724 appears beside and offset from the real world object 702.

FIG. 7C is an image 740 illustrating an example of the same virtual content 724 projected using an optimized eye position obtained using the visual alignment systems and techniques described herein. As illustrated in FIG. 7C, when properly aligned, the virtual content 724 can provide an appearance that some or all of the buildings on the real world object 702 are extending from the real world object in 3D.

Figure 8A:
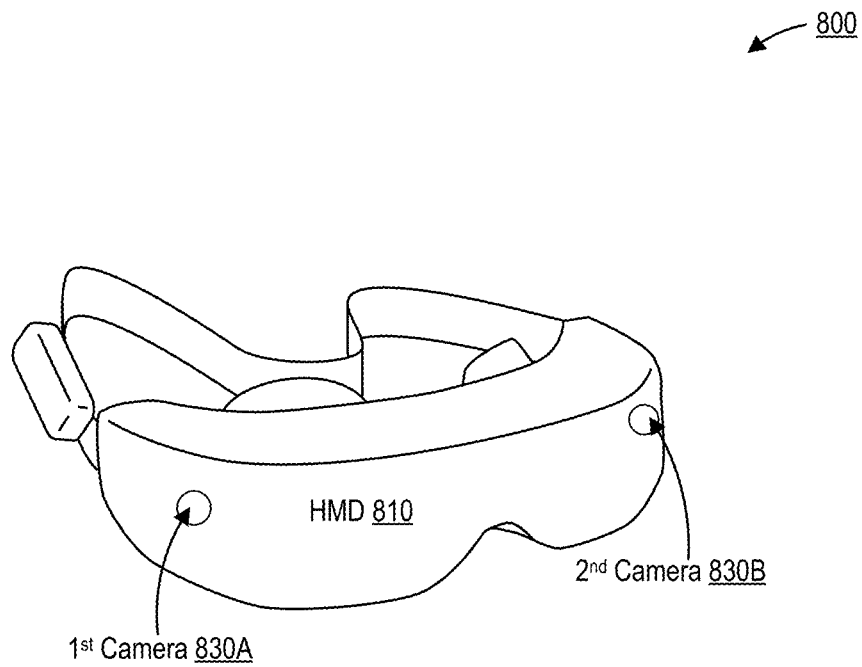
FIG. 8A is a perspective diagram illustrating a head-mounted display (HMD) that performs feature tracking and/or VSLAM, in accordance with some examples of the present disclosure.

FIG. 8A is a perspective diagram 800 illustrating a head-mounted display (HMD) 810 that performs feature tracking and/or visual simultaneous localization and mapping (VSLAM), in accordance with some examples. The HMD 810 may be, for example, an augmented reality (AR) headset, a virtual reality (VR) headset, a mixed reality (MR) headset, an extended reality (XR) headset, or some combination thereof. The HMD 810 may be an example of an XR system 200, a SLAM system 300, or a combination thereof. The HMD 810 includes a first camera 830A and a second camera 830B along a front portion of the HMD 810. The first camera 830A and the second camera 830B may be two of image sensor 202. In some examples, the HMD 810 may only have a single camera. In some examples, the HMD 810 may include one or more additional cameras in addition to the first camera 830A and the second camera 830B. In some examples, the HMD 810 may include one or more additional sensors in addition to the first camera 830A and the second camera 830B.

Figure 8B:
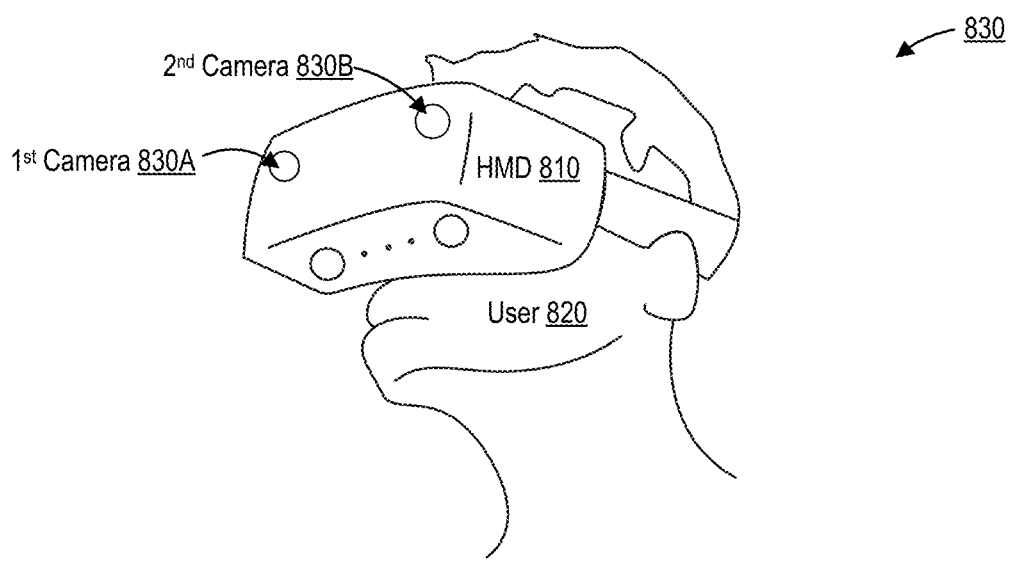
FIG. 8B is a perspective diagram illustrating the HMD of FIG. 8A being worn by a user, in accordance with some examples of the present disclosure.

FIG. 8B is a perspective diagram 830 illustrating the head-mounted display (HMD) 810 of FIG. 8A being worn by a user 820, in accordance with some examples. The user 820 wears the HMD 810 on the user 820's head over the user 820's eyes. The HMD 810 can capture images with the first camera 830A and the second camera 830B. In some examples, the HMD 810 displays one or more display images toward the user 820's eyes that are based on the images captured by the first camera 830A and the second camera 830B. The display images may provide a stereoscopic view of the environment, in some cases with information overlaid and/or with other modifications. For example, the HMD 810 can display a first display image to the user 820's right eye, the first display image based on an image captured by the first camera 830A. The HMD 810 can display a second display image to the user 820's left eye, the second display image based on an image captured by the second camera 830B. For instance, the HMD 810 may provide overlaid information in the display images overlaid over the images captured by the first camera 830A and the second camera 830B.

Figure 9:
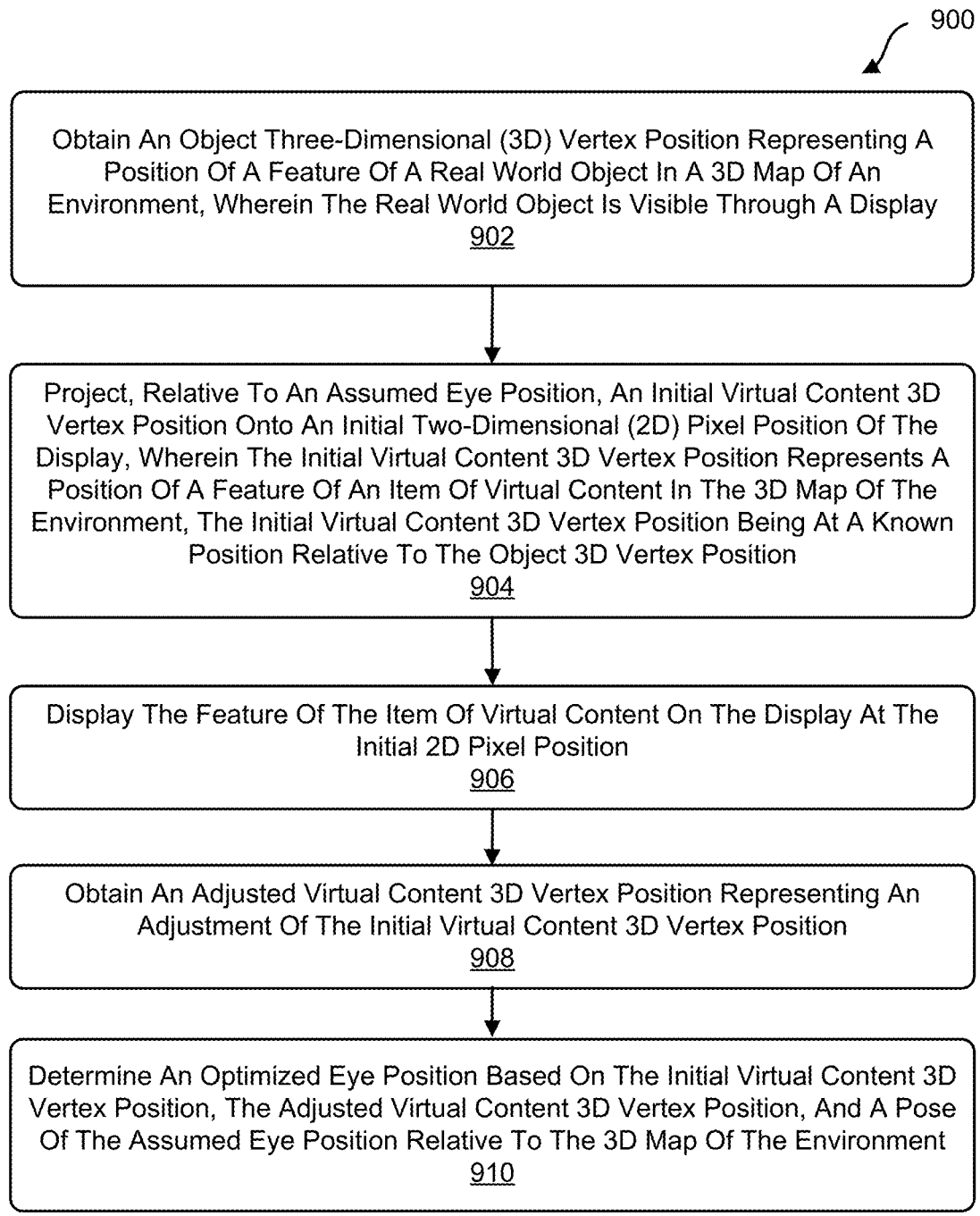
FIG. 9 is a flow diagram illustrating an example of an image processing technique, in accordance with some examples of the present disclosure.

FIG. 9 is a flow diagram of a process 900 for alignment of displayed virtual content. The process 900 may be performed by a computing device (or apparatus) or a component (e.g., a chipset, codec, etc.) of the computing device. The computing device may be a mobile device, a network-connected wearable such as a watch, an extended reality (XR) device (e.g., XR system 200 of FIG. 2) such as a VR device or AR device, a vehicle or component or system of a vehicle, a network node/entity/device, wireless device, or other type of computing device. The operations of the process 900 may be implemented as software components that are executed and run on one or more processors.

At block 902, the computing device (or component thereof) may obtain an object 3D vertex position (e.g., calibration target 502 of FIG. 5A) representing a position of a feature of a real world object in a 3D map of an environment (e.g., 3D map 605 of FIG. 6A through FIG. 6D). In some aspects, the real world object is visible through a display (e.g., display 209 of FIG. 2). In some aspects, the real world object is a calibration target (e.g., calibration target 502 of FIG. 5A). In some cases, the calibration target has known dimensions and the virtual content includes one or more features aligned to one or more features of the calibration target in the 3D map of the environment based on the known dimensions.

At block 904, the computing device (or component thereof) may project, relative to an assumed eye position (e.g., assumed eye position 604 of FIG. 6A through FIG. 6D), an initial virtual content 3D vertex position (e.g., 3D vertices 606) onto an initial 2D pixel position (e.g., 3D pixel positions 608) of the display. In some cases, the initial virtual content 3D vertex position represents a position of a feature of an item of virtual content in the 3D map of the environment (e.g., 3D alignment points 506 of FIG. 5A), the initial virtual content 3D vertex position being at a known position relative to the object 3D vertex position (e.g., positioned relative to and/or anchored to the object 3D vertex position.

At block 906, the computing device (or component thereof) may display the feature of the item of virtual content on the display at the initial 2D pixel position.

At block 908, the computing device (or component thereof) may obtain an adjusted virtual content 3D vertex position representing an adjustment (e.g., adjustment vectors 508) of the initial virtual content 3D vertex position.

At block 910, the computing device (or component thereof) may determine an optimized eye position (e.g., estimated eye position 672 of FIG. 6D) based on the initial virtual content 3D vertex position, the adjusted virtual content 3D vertex position, and a pose of the assumed eye position relative to the 3D map of the environment.

In some implementations, determining the optimized eye position includes generating an estimated eye position, projecting, from the estimated eye position, the initial virtual content 3D vertex position onto a corresponding 2D pixel position of the display (e.g., 2D pixel positions 678 of FIG. 6D), projecting, from the assumed eye position, the adjusted virtual content 3D vertex position onto an adjusted 2D pixel position of the display (e.g., 2D pixel positions 677 of FIG. 6D), and determining a misalignment between the corresponding 2D pixel position and the adjusted 2D pixel position, and iteratively adjusting the estimated eye position to minimize the misalignment between the corresponding 2D pixel position and the adjusted 2D pixel position. In some aspects, the optimized eye position corresponds to the estimated eye position when the misalignment is minimized. In some cases, a view frustum for the assumed eye position is different from an additional view frustum for the optimized eye position. In some examples, a view frustum for the estimated eye position is adjusted for each iteration of the estimated eye position.

In some cases, to iteratively adjust the estimated eye position to minimize the misalignment between the corresponding 2D pixel position and the adjusted 2D pixel position, the computing device (or component thereof) may minimize a distance (e.g., $\vec{x}_{ua,i} - \vec{x}_{eo,i}$ of Equation (4)) between the corresponding 2D pixel position and the adjusted 2D pixel position. In some cases, to iteratively adjust the estimated eye position to minimize the misalignment between the corresponding 2D pixel position and the adjusted 2D pixel position, the computing device (or component thereof) may minimize a loss function (e.g., loss function ρ of Equation (4)) based on a distance between the corresponding 2D pixel position and the adjusted 2D pixel position.

In some implementations, the computing device (or component thereof) may obtain one or more additional object 3D vertex positions representing a position of one or more features of the real world object in the 3D map of the environment, project, relative to the assumed eye position, one or more additional initial virtual content 3D vertex positions onto one or more additional initial 2D pixel positions of the display. In some cases, the one or more additional initial virtual content 3D vertex positions represent positions of one or more additional features of the virtual content in the 3D map of the environment, the one or more additional initial virtual content 3D vertex positions being at one or more additional known positions relative to the one or more additional object 3D vertex positions, display the one or more additional features of the virtual content on the display at the one or more additional initial 2D pixel positions, obtain one or more additional adjusted virtual content 3D vertex positions, and determine the optimized eye position. In some examples, the optimized eye position is based on the initial virtual content 3D vertex position, the adjusted virtual content 3D vertex position, the one or more additional initial virtual content 3D vertex positions, the one or more additional adjusted virtual content 3D vertex positions, and a pose of the assumed eye position relative to the 3D map of the environment. In some cases, the one or more additional adjusted virtual content 3D vertex positions represent adjustments of the one or more additional initial virtual content 3D vertex positions. In some examples, the optimized eye position is unknown when obtaining the one or more additional adjusted virtual content 3D vertex positions.

In some implementations, the computing device (or component thereof) may project, from a 3D position corresponding to the optimized eye position, at least one additional virtual content on the display. In some examples, the 3D position corresponding to the optimized eye position is determined relative to the assumed eye position.

In some aspects, the computing device (or component thereof) may determine optimized eye positions on a user-by-user basis.

In some cases, the optimized eye position is unknown when obtaining the adjusted virtual content 3D vertex position.

The process 900 can also be performed by a computing device with the architecture of the computing system 1000 shown in FIG. 10. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 900. In some cases, the computing device or apparatus may include various components, such as one or mor e input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by block diagrams in FIG. 1 (of image capture and processing system 100), FIG. 2 (of XR system 200), FIG. 3 (of SLAM system 300), and FIG. 10 (of computing system 1000) and the flow diagram illustrating process 900 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams 100, 200, 300, and 1000 and the flow diagram illustrating process 900 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 is a diagram illustrating an example of a system for implementing certain aspects of the present technology. In particular, FIG. 10 illustrates an example of computing system 1000, which can be for example any computing device making up the image capture and processing system 100, the image capture device 105A, the image processing device 105B, the XR system, the SLAM system 300, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some cases, one or more of the described system components represents many such components each performing some or all of the function for which the component is described. In some cases, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for aligning display of virtual content, comprising: at least one memory; and at least one processor coupled to the at least one memory and configured to: obtain an object three-dimensional (3D) vertex position representing a position of a feature of a real world object in a 3D map of an environment, wherein the real world object is visible through a display; project, relative to an assumed eye position, an initial virtual content 3D vertex position onto an initial two-dimensional (2D) pixel position of the display, wherein the initial virtual content 3D vertex position represents a position of a feature of an item of virtual content in the 3D map of the environment, the initial virtual content 3D vertex position being at a known position relative to the object 3D vertex position;

display the feature of the item of virtual content on the display at the initial 2D pixel position; obtain an adjusted virtual content 3D vertex position representing an adjustment of the initial virtual content 3D vertex position; and determine an optimized eye position based on the initial virtual content 3D vertex position, the adjusted virtual content 3D vertex position, and a pose of the assumed eye position relative to the 3D map of the environment.

Aspect 2: The apparatus of Aspect 1, wherein the real world object comprises a calibration target.

Aspect 3: The apparatus of Aspect 2, wherein: the calibration target has known dimensions; and the virtual content includes one or more features aligned to one or more features of the calibration target in the 3D map of the environment based on the known dimensions.

Aspect 4: The apparatus of any one of Aspects 1 to 3, wherein, to determine the 3D position corresponding to the optimized eye position in the 3D map of the environment, the at least one processor is configured to: generate an estimated eye position; project, from the estimated eye position, the initial virtual content 3D vertex position onto a corresponding 2D pixel position of the display; project, from the assumed eye position, the adjusted virtual content 3D vertex position onto an adjusted 2D pixel position of the display; determine a misalignment between the corresponding 2D pixel position and the adjusted 2D pixel position; and iteratively adjust the estimated eye position to minimize the misalignment between the corresponding 2D pixel position and the adjusted 2D pixel position, wherein the optimized eye position corresponds to the estimated eye position when the misalignment is minimized.

Aspect 5: The apparatus of Aspect 4, wherein, to iteratively adjust the estimated eye position to minimize the misalignment between the corresponding 2D pixel position and the adjusted 2D pixel position, the at least one processor is configured to minimize a distance between the corresponding 2D pixel position and the adjusted 2D pixel position.

Aspect 6: The apparatus of Aspect 4, wherein, to iteratively adjust the estimated eye position to minimize the misalignment between the corresponding 2D pixel position and the adjusted 2D pixel position, the at least one processor is configured to minimize a loss function based on a distance between the corresponding 2D pixel position and the adjusted 2D pixel position.

Aspect 7: The apparatus of Aspect 4, wherein a view frustum for the assumed eye position is different from an additional view frustum for the optimized eye position.

Aspect 8: The apparatus of Aspect 4, wherein a view frustum for the estimated eye position is adjusted for each iteration of the estimated eye position.

Aspect 9: The apparatus of any one of Aspects 1 to 8, wherein to determine the optimized eye position, the at least one processor is configured to: obtain one or more additional object 3D vertex positions representing a position of one or more features of the real world object in the 3D map of the environment; project, relative to the assumed eye position, one or more additional initial virtual content 3D vertex positions onto one or more additional initial 2D pixel positions of the display, wherein the one or more additional initial virtual content 3D vertex positions represent positions of one or more additional features of the virtual content in the 3D map of the environment, the one or more additional initial virtual content 3D vertex positions being at one or more additional known positions relative to the one or more additional object 3D vertex positions; display the one or more additional features of the virtual content on the display at the one or more additional initial 2D pixel positions; obtain one or more additional adjusted virtual content 3D vertex positions, wherein: the one or more additional adjusted virtual content 3D vertex positions represent adjustments of the one or more additional initial virtual content 3D vertex positions; and the optimized eye position is unknown when obtaining the one or more additional adjusted virtual content 3D vertex positions; and determine the optimized eye position, wherein the optimized eye position is based on the initial virtual content 3D vertex position, the adjusted virtual content 3D vertex position, the one or more additional initial virtual content 3D vertex positions, the one or more additional adjusted virtual content 3D vertex positions, and a pose of the assumed eye position relative to the 3D map of the environment.

Aspect 10: The apparatus of any one of Aspects 1 to 9, wherein the at least one processor is configured project, from a 3D position corresponding to the optimized eye position, at least one additional virtual content on the display, wherein the 3D position corresponding to the optimized eye position is determined relative to the assumed eye position.

Aspect 11: The apparatus of any one of Aspects 1 to 10, wherein the at least one processor is configured to determine optimized eye positions on a user-by-user basis.

Aspect 12: The apparatus of any one of Aspects 1 to 11, wherein the optimized eye position is unknown when obtaining the adjusted virtual content 3D vertex position.

Aspect 13: The apparatus of any one of Aspects 1 to 12, wherein the apparatus comprises the display.

Aspect 14: A method for aligning display of virtual content, comprising: obtaining an object 3D vertex position representing a position of a feature of a real world object in a 3D map of an environment, wherein the real world object is visible through a display; projecting, relative to an assumed eye position, an initial virtual content 3D vertex position onto an initial 2D pixel position of the display, wherein the initial virtual content 3D vertex position represents a position of a feature of an item of virtual content in the 3D map of the environment, the initial virtual content 3D vertex position being at a known position relative to the object 3D vertex position; displaying the feature of the item of virtual content on the display at the initial 2D pixel position; obtaining an adjusted virtual content 3D vertex position representing an adjustment of the initial virtual content 3D vertex position; and determining an optimized eye position based on the initial virtual content 3D vertex position, the adjusted virtual content 3D vertex position, and a pose of the assumed eye position relative to the 3D map of the environment.

Aspect 15: The method of Aspect 14, wherein the real world object comprises a calibration target.

Aspect 16: The method of Aspect 15, wherein: the calibration target has known dimensions; and the virtual content includes one or more features aligned to one or more features of the calibration target in the 3D map of the environment based on the known dimensions.

Aspect 17: The method of any of Aspects 14 to 16, wherein determining the optimized eye position comprises: generating an estimated eye position; projecting, from the estimated eye position, the initial virtual content 3D vertex position onto a corresponding 2D pixel position of the display; projecting, from the assumed eye position, the adjusted virtual content 3D vertex position onto an adjusted 2D pixel position of the display; determining a misalignment between the corresponding 2D pixel position and the adjusted 2D pixel position; and iteratively adjusting the estimated eye position to minimize the misalignment between the corresponding 2D pixel position and the adjusted 2D pixel position, wherein the optimized eye position corresponds to the estimated eye position when the misalignment is minimized.

Aspect 18: The method of Aspect 17, wherein iteratively adjusting the estimated eye position comprises minimizing a distance between the corresponding 2D pixel position and the adjusted 2D pixel position.

Aspect 19: The method of Aspect 17, wherein iteratively adjusting the estimated eye position comprises minimizing a loss function based on a distance between the corresponding 2D pixel position and the adjusted 2D pixel position.

Aspect 20: The method of Aspect 17, wherein a view frustum for the assumed eye position is different from an additional view frustum for the optimized eye position.

Aspect 21: The method of Aspect 17, wherein a view frustum for the assumed eye position is adjusted for each iteration of the assumed eye position.

Aspect 22: The method of any of Aspects 14 to 21, wherein determining the optimized eye position comprises: obtaining one or more additional object 3D vertex positions representing a position of one or more features of the real world object in the 3D map of the environment; projecting, relative to the assumed eye position, one or more additional initial virtual content 3D vertex positions onto one or more additional initial 2D pixel positions of the display, wherein the one or more additional initial virtual content 3D vertex positions represent positions of one or more additional features of the virtual content in the 3D map of the environment, the one or more additional initial virtual content 3D vertex positions being at one or more additional known positions relative to the one or more additional object 3D vertex positions; displaying the one or more additional features of the virtual content on the display at the one or more additional initial 2D pixel positions; obtaining one or more additional adjusted virtual content 3D vertex positions, wherein: the one or more additional adjusted virtual content 3D vertex positions represent adjustments of the one or more additional initial virtual content 3D vertex positions; and the optimized eye position is unknown when obtaining the one or more additional adjusted virtual content 3D vertex positions; and determining the optimized eye position, wherein the optimized eye position is based on the initial virtual content 3D vertex position, the adjusted virtual content 3D vertex position, the one or more additional initial virtual content 3D vertex positions, the one or more additional adjusted virtual content 3D vertex positions, and a pose of the assumed eye position relative to the 3D map of the environment.

Aspect 23: The method of any of Aspects 14 to 22, further comprising projecting, from a 3D position corresponding to the optimized eye position, at least one additional virtual content on the display, wherein the 3D position corresponding to the optimized eye position is determined relative to the assumed eye position.

Aspect 24: The method of any of Aspects 14 to 23, further comprising determining optimized eye positions on a user-by-user basis.

Aspect 25: The method of any of Aspects 14 to 24, wherein the optimized eye position is unknown when obtaining the adjusted virtual content 3D vertex position.

Aspect 26: A non-transitory computer-readable storage medium having stored thereon instructions which, when executed by one or more processors, cause the one or more processors to perform any of the operations of aspects 1 to 25.

Aspect 27: An apparatus comprising means for performing any of the operations of aspects 1 to 25.

What is claimed is:

1. An apparatus for aligning display of virtual content, comprising:
   at least one memory; and
   at least one processor coupled to the at least one memory and configured to:
     obtain an object three-dimensional (3D) vertex position representing a position of a feature of a real world object in a 3D map of an environment, wherein the real world object is visible through a display;
     project, relative to an assumed eye position, an initial virtual content 3D vertex position onto an initial two-dimensional (2D) pixel position of the display, wherein the initial virtual content 3D vertex position represents a position of a feature of an item of virtual content in the 3D map of the environment, the initial virtual content 3D vertex position being at a known position relative to the object 3D vertex position;
     display the feature of the item of virtual content on the display at the initial 2D pixel position;
     obtain an adjusted virtual content 3D vertex position representing an adjustment of the initial virtual content 3D vertex position; and
     determine an optimized eye position based on the initial virtual content 3D vertex position, the adjusted virtual content 3D vertex position, and a pose of the assumed eye position relative to the 3D map of the environment.

2. The apparatus of claim 1, wherein the real world object comprises a calibration target.

3. The apparatus of claim 2, wherein:
   the calibration target has known dimensions; and
   the virtual content includes one or more features aligned to one or more features of the calibration target in the 3D map of the environment based on the known dimensions.

4. The apparatus of claim 1, wherein, to determine the optimized eye position, the at least one processor is configured to:
   generate an estimated eye position;
   project, from the estimated eye position, the initial virtual content 3D vertex position onto a corresponding 2D pixel position of the display;
   project, from the assumed eye position, the adjusted virtual content 3D vertex position onto an adjusted 2D pixel position of the display;
   determine a misalignment between the corresponding 2D pixel position and the adjusted 2D pixel position; and
   iteratively adjust the estimated eye position to minimize the misalignment between the corresponding 2D pixel position and the adjusted 2D pixel position, wherein the optimized eye position corresponds to the estimated eye position when the misalignment is minimized.

5. The apparatus of claim 4, wherein, to iteratively adjust the estimated eye position to minimize the misalignment between the corresponding 2D pixel position and the adjusted 2D pixel position, the at least one processor is configured to minimize a distance between the corresponding 2D pixel position and the adjusted 2D pixel position.

6. The apparatus of claim 4, wherein, to iteratively adjust the estimated eye position to minimize the misalignment between the corresponding 2D pixel position and the adjusted 2D pixel position, the at least one processor is configured to minimize a loss function based on a distance between the corresponding 2D pixel position and the adjusted 2D pixel position.

7. The apparatus of claim 4, wherein a view frustum for the assumed eye position is different from an additional view frustum for the optimized eye position.

8. The apparatus of claim 4, wherein a view frustum for the estimated eye position is adjusted for each iteration of the estimated eye position.

9. The apparatus of claim 1, wherein to determine the optimized eye position, the at least one processor is configured to:
    obtain one or more additional object 3D vertex positions representing a position of one or more features of the real world object in the 3D map of the environment;
    project, relative to the assumed eye position, one or more additional initial virtual content 3D vertex positions onto one or more additional initial 2D pixel positions of the display, wherein the one or more additional initial virtual content 3D vertex positions represent positions of one or more additional features of the virtual content in the 3D map of the environment, the one or more additional initial virtual content 3D vertex positions being at one or more additional known positions relative to the one or more additional object 3D vertex positions;
    display the one or more additional features of the virtual content on the display at the one or more additional initial 2D pixel positions;
    obtain one or more additional adjusted virtual content 3D vertex positions, wherein:
        the one or more additional adjusted virtual content 3D vertex positions represent adjustments of the one or more additional initial virtual content 3D vertex positions; and
        the optimized eye position is unknown when obtaining the one or more additional adjusted virtual content 3D vertex positions; and
    determine the optimized eye position, wherein the optimized eye position is based on the initial virtual content 3D vertex position, the adjusted virtual content 3D vertex position, the one or more additional initial virtual content 3D vertex positions, the one or more additional adjusted virtual content 3D vertex positions, and a pose of the assumed eye position relative to the 3D map of the environment.

10. The apparatus of claim 1, wherein the at least one processor is configured project, from a 3D position corresponding to the optimized eye position, at least one additional virtual content on the display, wherein the 3D position corresponding to the optimized eye position is determined relative to the assumed eye position.

11. The apparatus of claim 1, wherein the at least one processor is configured to determine optimized eye positions on a user-by-user basis.

12. The apparatus of claim 1, wherein the optimized eye position is unknown when obtaining the adjusted virtual content 3D vertex position.

13. The apparatus of claim 1, wherein the apparatus comprises the display.

14. A method for aligning display of virtual content, comprising:
    obtaining an object 3D vertex position representing a position of a feature of a real world object in a 3D map of an environment, wherein the real world object is visible through a display;
    projecting, relative to an assumed eye position, an initial virtual content 3D vertex position onto an initial 2D pixel position of the display, wherein the initial virtual content 3D vertex position represents a position of a feature of an item of virtual content in the 3D map of the environment, the initial virtual content 3D vertex position being at a known position relative to the object 3D vertex position;
    displaying the feature of the item of virtual content on the display at the initial 2D pixel position;
    obtaining an adjusted virtual content 3D vertex position representing an adjustment of the initial virtual content 3D vertex position; and
    determining an optimized eye position based on the initial virtual content 3D vertex position, the adjusted virtual content 3D vertex position, and a pose of the assumed eye position relative to the 3D map of the environment.

15. The method of claim 14, wherein the real world object comprises a calibration target.

16. The method of claim 14, wherein determining the optimized eye position comprises:
    generating an estimated eye position;
    projecting, from the estimated eye position, the initial virtual content 3D vertex position onto a corresponding 2D pixel position of the display;
    projecting, from the assumed eye position, the adjusted virtual content 3D vertex position onto an adjusted 2D pixel position of the display;
    determining a misalignment between the corresponding 2D pixel position and the adjusted 2D pixel position; and
    iteratively adjusting the estimated eye position to minimize the misalignment between the corresponding 2D pixel position and the adjusted 2D pixel position, wherein the optimized eye position corresponds to the estimated eye position when the misalignment is minimized.

17. The method of claim 16, wherein iteratively adjusting the estimated eye position comprises minimizing a loss function based on a distance between the corresponding 2D pixel position and the adjusted 2D pixel position.

18. The method of claim 14, further comprising projecting, from a 3D position corresponding to the optimized eye position, at least one additional virtual content on the display, wherein the 3D position corresponding to the optimized eye position is determined relative to the assumed eye position.

19. The method of claim 14, further comprising determining optimized eye positions on a user-by-user basis.

20. The method of claim 14, wherein the optimized eye position is unknown when obtaining the adjusted virtual content 3D vertex position.

* * * * *